United States Patent [19]

Sullivan et al.

[11] Patent Number: 5,173,643

[45] Date of Patent: Dec. 22, 1992

[54] CIRCUIT FOR DIMMING COMPACT FLUORESCENT LAMPS

[75] Inventors: Charles R. Sullivan, Berkeley, Calif.; Scott R. Jurell, Mertztown; David G. Luchaco, Macungie, both of Pa.

[73] Assignee: Lutron Electronics Co., Inc., Coopersburg, Pa.

[21] Appl. No.: 543,271

[22] Filed: Jun. 25, 1990

[51] Int. Cl.$^5$ ............................................. H05K 5/00
[52] U.S. Cl. .................................. 315/276; 315/278; 315/282; 315/257; 315/219; 315/218; 315/189
[58] Field of Search ............... 315/276, 278, 282, 189, 315/257, 218, 219; 363/97, 98, 132, 131

[56] References Cited

U.S. PATENT DOCUMENTS

| | | | |
|---|---|---|---|
| 3,619,716 | 11/1971 | Spira et al. | 315/244 |
| 3,731,142 | 5/1973 | Spira et al. | 315/94 |
| 3,927,345 | 12/1975 | Licata et al. | 315/DIG. 5 |
| 4,001,637 | 1/1977 | Gray | 315/205 |
| 4,207,498 | 6/1980 | Spira et al. | 315/98 |
| 4,350,935 | 9/1982 | Spira et al. | 315/291 |
| 4,560,908 | 12/1985 | Stupp et al. | 315/219 |
| 4,609,850 | 9/1986 | Hanlet | 315/219 |
| 4,651,060 | 3/1987 | Clark | 315/199 |
| 4,663,569 | 5/1987 | Alley et al. | 315/175 |
| 4,663,570 | 5/1987 | Luchaco et al. | 315/219 |
| 4,682,082 | 7/1987 | MacAskill et al. | 315/219 |
| 4,686,427 | 8/1987 | Burke | 315/219 |
| 4,700,113 | 10/1987 | Stupp et al. | 315/219 |
| 4,701,671 | 10/1987 | Stupp et al. | 215/219 |
| 4,853,598 | 8/1989 | Kusko et al. | 315/101 |
| 4,961,029 | 10/1990 | Shimizu et al. | 315/219 |
| 5,001,386 | 3/1991 | Sullivan et al. | 315/219 |

FOREIGN PATENT DOCUMENTS

| | | |
|---|---|---|
| 543136 | 2/1942 | United Kingdom . |
| 1202505 | 8/1970 | United Kingdom . |
| 1358829 | 7/1974 | United Kingdom . |
| 1487584 | 10/1977 | United Kingdom . |
| 2001811 | 2/1979 | United Kingdom . |
| 2119184 | 11/1983 | United Kingdom . |
| 2120870 | 12/1983 | United Kingdom ............... 315/219 |
| 2232543 | 12/1990 | United Kingdom . |

OTHER PUBLICATIONS

May & Christe GmbH Transformatorenwerke brochure.
Lutron Electronics Co., Inc. Hi-lume® Fluorescent Dimming Control brochure.
Luciano Di Fraia, "A method to achieve continuous dimming of low pressure sodium and other gas discharge lamps," *Journal of IES*, Jul. 1981, pp. 245–252.
Welding Power Handbook by Union Carbide.
Cherry/Gas Plasma Displays brochure.

*Primary Examiner*—Eugene R. LaRoche
*Assistant Examiner*—Tan Dinh
*Attorney, Agent, or Firm*—Seidel, Gonda, Lavorgna & Monaco

[57] ABSTRACT

A dimming control circuit provides power from an ac source to a compact fluorescent lamp. The circuit generally includes a resonant half-bridge inverter driven by a pulse-duration-modulated voltage, for providing a high-frequency ac voltage between the lamp electrodes. A combination inductive and capacitive snubber circuit reduces switching losses in the inverter and increases the efficiency of the dimming circuit. A low-voltage transformer connected across the resonant portion of the inverter provides voltage to heat the lamp filaments. The filament voltage is substantially constant over a range of pulse-durations providing a dimming range from about 100% to 1% of full light output. A power supply circuit having a power factor of about 0.95 provides both high-voltage and low-voltage dc power to the dimming circuit with minimal losses. A shutdown circuit is provided to shut off power to the lamp if the dimming circuit is miswired or a ground fault occurs.

8 Claims, 15 Drawing Sheets

AC COMPONENT

DC COMPONENT

RESULTANT AC & DC

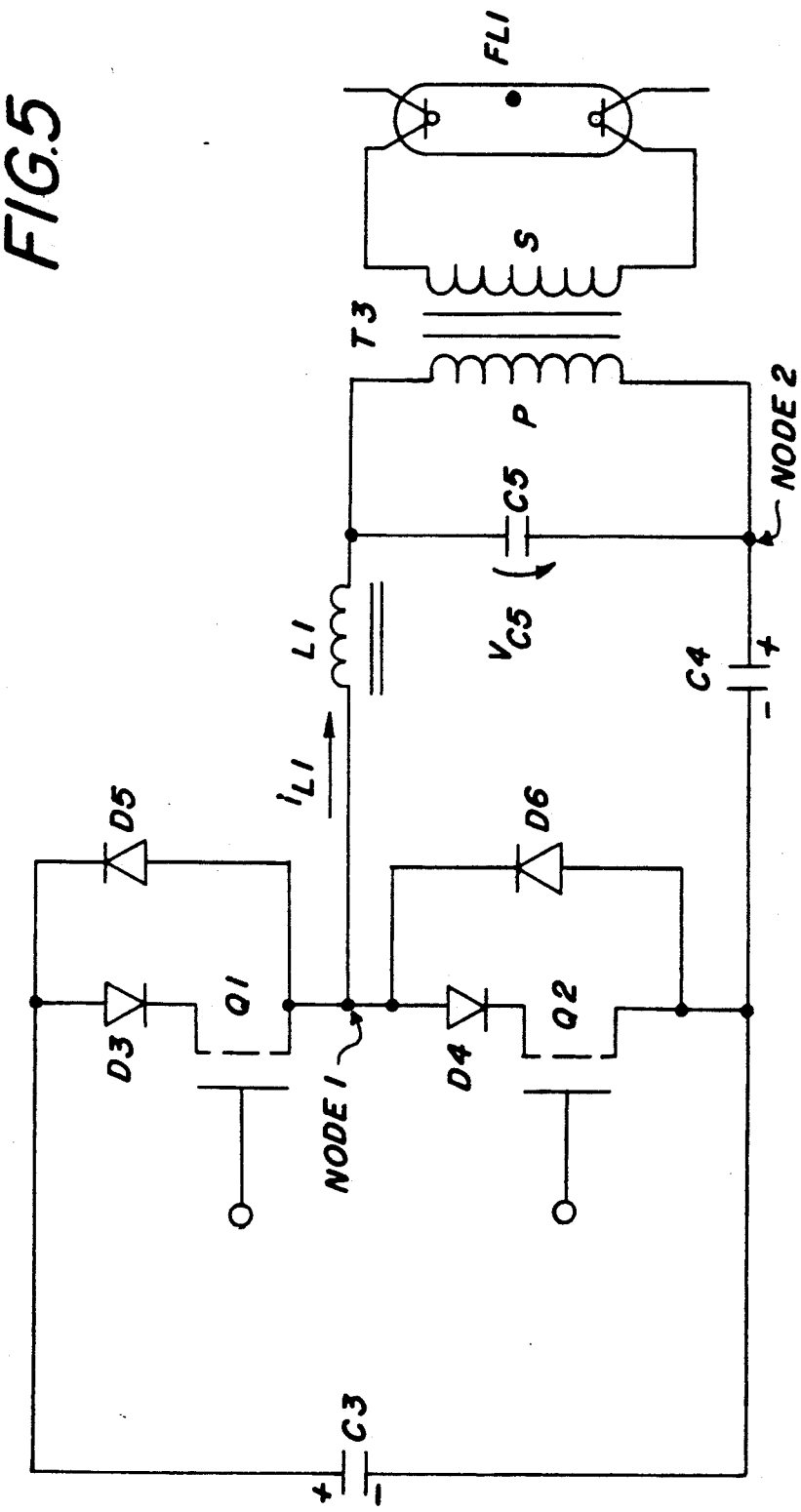

CIRCUIT FOR DIMMING COMPACT FLUORESCENT LAMPS

BACKGROUND OF THE INVENTION

1. Field of the Invention

This invention pertains to dimming gas discharge lamps and, more particularly, to dimming compact fluorescent lamps.

2. Description of the Related Art

A gas discharge lamp converts electrical energy into visible energy with high efficiency. A gas discharge lamp is generally an elongated gas-filled (usually low pressure mercury vapor) tube having electrodes at each end. Each electrode is typically formed from a resistive filament(usually tungsten) coated with a thermionically emissive material, such as a mixture of alkaline earth oxides.

The steady-state operation of a typical gas discharge lamp is as follows: Voltage is applied across the resistive filaments, heating the electrodes to a temperature sufficient to cause thermionic emission of electrons into the discharge tube. A voltage applied between the electrodes accelerates the electrons toward the anode. Enroute to the anode, the electrons collide with gas atoms to produce positive ions and additional electrons, forming in the tube a gas plasma of positive and negative charge carriers. The electrons continue to stream toward the anode and the positive ions toward the cathode, sustaining an electric discharge in the tube and further heating the electrodes. (If the applied power is ac, the electrodes reverse polarity during each half cycle.)

The discharge causes the emission of radiation having a wavelength dependent upon the particular fill gas and the electrical parameters of the discharge. Because each collision produces additional electrons and ions, increases in the arc current cause the impedance of the lamp to decrease, a characteristic known as "negative resistance." Operation of the lamp is inherently unstable, due to this negative resistance characteristic, and current between the electrodes must be limited to avoid damaging the lamp.

Dimming of gas discharge lamps is well known. A circuit for dimming a fluorescent gas discharge lamp is disclosed in U.S. Pat. No. 3,927,345, issued Dec. 16, 1975, to Licata et al., incorporated herein by reference. A fluorescent lamp is a gas discharge lamp in which the inner surface of the tube is coated with a fluorescent phosphor. The phosphor is excited by ultraviolet radiation from the electric discharge and fluoresces, providing visible light. Licata discloses a phase control dimming circuit which provides phase controlled voltage from a 60Hz ac source to a fluorescent lamp in series with an inductive ballast. The dimming circuit employs a bi-directional triode-type thyristor (triac) as the main switching device and includes a dc compensation circuit to ensure symmetrical triac firing delays in each half cycle of power flow from the ac source. There is no current through the lamp during the triac firing delay. Symmetrically firing the triac prevents an excessive amount of dc current from flowing through the lamp, which can cause lamp flickering and saturation of the inductive ballast. The circuit operates over a dimming range from about 100% to 50% of full light output. Below about 50% light output, the electric discharge cannot be sustained, because the triac firing delay is longer than the recombination time of the gas plasma in the discharge tube.

U.S. Pat. No. 4,001,637, issued Jan. 4, 1977, to Gray, discloses a gas discharge lamp dimming circuit that is capable of operating lamps at dimming levels below 50% of full light output. Low dimming levels are attained by providing uninterrupted filtered dc current to the lamp. The circuit includes a capacitive ballast, a full wave rectifier, and an output filter. Ac current flows from a phase controlled source through the capacitive ballast to a full-wave rectifier. Pulsating dc current is provided by the full-wave rectifier to an LC low pass filter and then to the lamp electrodes. However, dc current tends to cause anode oscillations, uneven illumination along the length of the lamp, and a reduction in useful lamp life.

Anode oscillations can be greatly reduced by operating a lamp at frequencies much higher than the fundamental frequency of the anode oscillation. U.S. Pat. No. 4,207,498, issued Jun. 10, 1980, to Spira et al., discloses a dimming system that includes a central inverter for providing a 23kHz ac current through the lamp. The lamp can be dimmed over a range from 100% to 1% of full light output by adjusting the amplitude of the inverter output. The use of high-frequency ac current also may increase the efficacy of the lamp by as much as 20%.

At low light levels (less than about 30% of full light output), however, the lamp tends to "striate"; i.e., to break up into alternating bands of bright and dim areas along the length of the tube. The mechanisms that cause striation are not completely understood, but it is believed to result from high-frequency currents reinforcing a standing wave of varying charge distribution between the lamp electrodes. For reasons that are not clear, small-diameter lamps and lamps with sharp bends (typical characteristics of compact fluorescent lamps) are more likely to striate.

SUMMARY OF THE INVENTION

The present invention provides a dimming circuit for compact fluorescent lamps which greatly reduces striation while maintaining a flicker-free dimming range from about 100% to 1% of full light output. The dimming circuit generally provides 27kHz sinusoidal current to the lamp electrodes to initiate and maintain an electric discharge through the lamp and, simultaneously, provides a small amount of substantially non-pulsating dc current to the electrodes to produce an asymmetric current waveform through the lamp. The asymmetric current flow greatly reduces visible striations in the lamp. We believe that the asymmetry alters the charge distribution in the tube to prevent formation of a standing wave between the lamp electrodes. Although a wave-like variation in charge distribution can be measured along the discharge tube, it is not a standing wave; it moves with a velocity that is determined by the magnitude of the dc component of current flow through the lamp. Visible striations are eliminated by providing to the lamps a dc current that causes the bright and dim bands, produced by the wave-like charge distribution, to move rapidly, so they become imperceptible. Too much dc current, however, causes anode oscillations. A suitable amount of dc current is selected by compromising between the effects of striations and anode oscillations. It has been found experimentally that a dc current of about, 0.04 to 1.4mA satisfactorily achieves this compromise for a typical compact fluorescent lamp. Generally, the optimum dc current increases over the dimming range between minimum and mid range power. At higher powers, the precise value of dc current is less critical. The ratio of dc to ac current in the low-to-mid range is preferably about 1:2. This corresponds to a dc current of about 0.04 to 0.7mA.

To balance the light output of a pair of series connected lamps mounted in a grounded fixture, the present invention provides a transformer having a center tapped secondary winding. The secondary winding provides voltage across the pair of lamps in series. The center tap is grounded so the maximum potential from the end of each lamp to the grounded fixture is approximately equal. This balances the capacitive ground currents through each lamp and, thus, the light output at low light levels.

The present invention generally includes a series connected capacitor and inductor that are driven into resonance by a pulse-duration-modulated half-bridge inverter circuit. A high-voltage transformer having its primary winding connected across the capacitor provides a sinusoidal voltage of variable RMS value across the lamp electrodes. A low-voltage transformer having its primary winding connected across the series connected capacitor and inductors provides substantially constant RMS voltage to the lamp filaments to keep the electrodes heated over a range of light levels.

A high-power-factor power supply circuit provides high voltage dc to the inverter circuit and low voltage dc to a regulating pulse-width-modulator integrated circuit, which controls the output of the inverter circuit. A full-wave bridge rectifier and dc filter capacitor rectifies 60Hz line voltage and provides high voltage dc to the inverter circuit. An inductor and a capacitor connected in series and parallel, respectively, with the ac side of the full-wave-bridge rectifier filter the 60Hz line voltage to improve the power factor of the supply circuit. A low-voltage dc regulator in series with the capacitor provides low-voltage dc to the pulse-width-modulator integrated circuit. The capacitor limits the power dissipation in the dc regulator by limiting the current flow therethrough.

A lossless inductive snubber reduces power dissipation in the inverter circuit while MOSFETS therein are changing from a non-conductive to a conductive state. A lossless capacitive snubber reduces inverter losses while the MOSFETS are changing from a conductive to a non-conductive state.

Lamp current is sensed by a sensing circuit having a dual slope characteristic. The sensing circuit is most sensitive at low current levels to provide tight control of light output at low end. At higher current levels, the sensing circuit is less sensitive to allow for more efficient operation. Sensing circuits of this type are shown in U.S. Pat. Nos. 4,728,866 (Capewell, et al.) and 4,663,570 (Luchaco, et al.), both assigned to the assignee of the present invention, and those patents are incorporated herein by reference. An error amplifier adjusts the pulse-width-modulator in accordance with the current sensing circuit to provide feedback control of the lamp current.

Various safety features are provided including a circuit for shutting the dimming circuit off when excessive voltages occur across the lamp electrodes. This may occur if a lamp is damaged or missing. An auxiliary winding is provided on the high-voltage transformer for sensing the voltage across the secondary winding. When the voltage on the auxiliary winding exceeds a predetermined maximum, a circuit shutdown comparator trips, shutting the dimming circuit off.

A similar circuit is provided to shut down the dimming circuit when excessive currents flow through the low-voltage filament transformer in case the circuit is accidentally miswired. A resistor electrically connected in series with the primary winding of the filament transformer produces a voltage that is proportional to the current flowing therethrough. When the voltage exceeds a predetermined maximum, a circuit shutdown comparator trips, shutting the dimming circuit off.

A ground-fault shutdown circuit includes a resistor connected between ground and the secondary winding of the high-voltage transformer. The voltage drop across this resistor is proportional to the current flowing through ground. When a ground-fault occurs, this voltage drop is sufficient to turn on a transistor and shut the dimming circuit off.

A circuit for detecting and compensating for out-of-phase current in the ac power supply circuit to the gas discharge lamp is provided. The circuit has means for sensing the voltage across the lamp and means for sensing the current drawn from the power supply circuit. A signal representative of the phase of the sensed current is generated from the sensed voltage and current. The signal is sent to a control means which controls the current output of the power supply circuit as a function of the phase of the sensed current, so that sufficient in-phase current is always provided to the lamp.

BRIEF DESCRIPTION OF THE DRAWINGS

FIG. 5 is a simplified schematic of the inverter circuit of FIGS. 3 and 4.

DETAILED DESCRIPTION OF THE INVENTION

Figure 1:
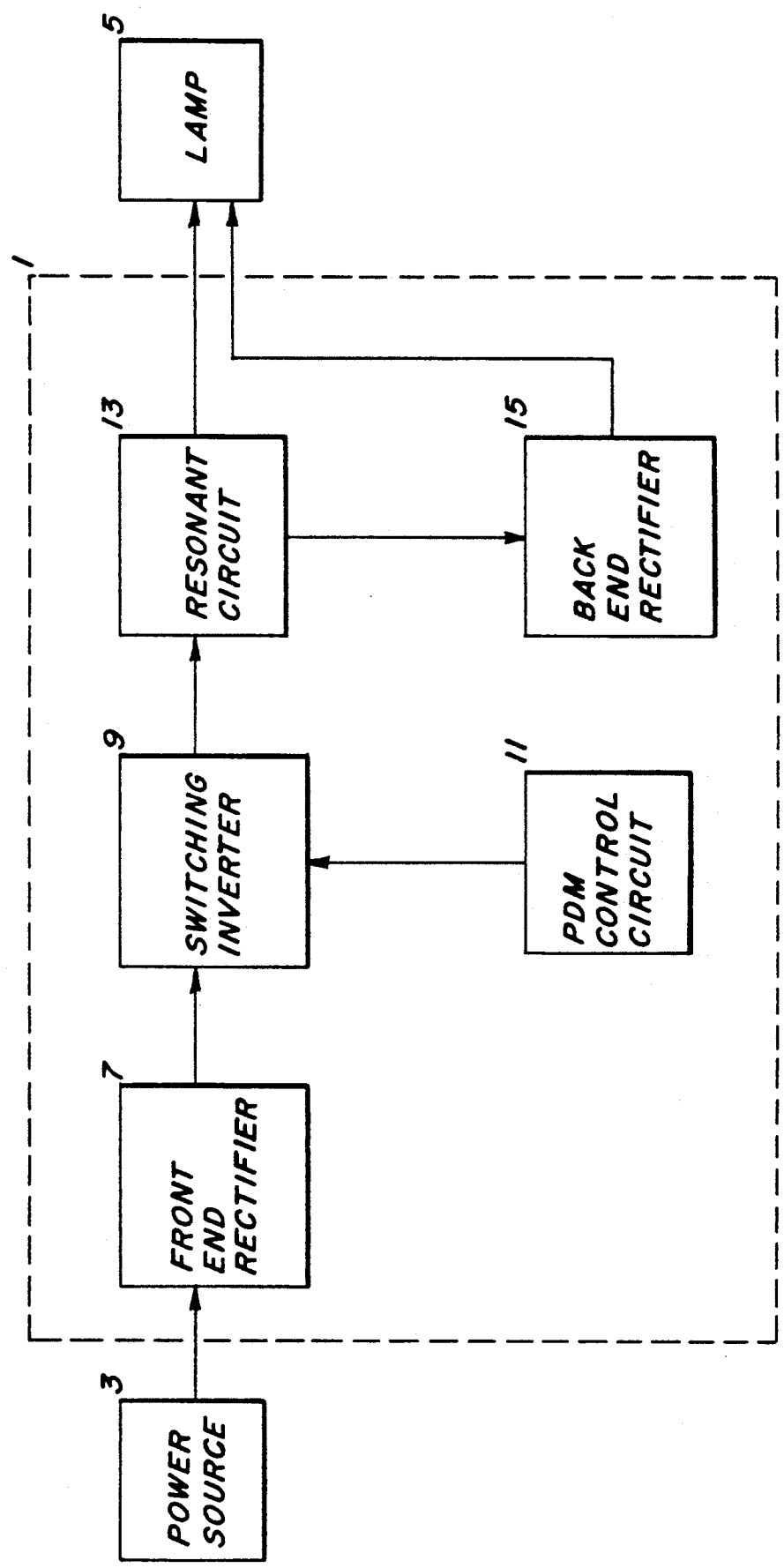
FIG. 1 is a block diagram of a dimming circuit of the present invention.

FIG. 1 shows a block diagram of the dimming circuit of the present invention. The dimming circuit 1, enclosed in the dashed lines, provides a variable amount of power from sinusoidal power source 3 to a gas discharge lamp 5. The dimming circuit generally includes a front-end rectifier 7 to convert a (typically) 60Hz ac voltage from power source 3 into a dc voltage provided to switching inverter 9. Switching inverter 9 converts the dc voltage into a high-frequency ac voltage consisting of alternately inverted and non-inverted rectangular pulses of voltage having variable duration. Pulse duration modulation (PDM) circuit 11 provides a modulating voltage waveform to switching inverter 9 to control the duration of each pulse.

The high-frequency ac voltage from switching inverter 9 drives resonant circuit 13 so that it resonates substantially sinusoidally, with an amplitude determined by the amplitude and frequency of the driving voltage and the magnification factor Q of the resonant circuit. The resonant circuit is essentially a symmetrical high-frequency sinusoidal current source with a variable amplitude determined by the pulse duration of the driving voltage from switching inverter 9. In this specification and the appended claims, a resonant circuit is understood to have a single fundamental mode of resonance. The term "peak response frequency" refers to the frequency at which this fundamental resonance is maximized. As applied to ac waveforms, the term "symmetrical" is understood to mean that the positive portion of the waveform is substantially identical in shape and magnitude to the corresponding negative portion of the waveform.

The current from resonant circuit 13 is provided to lamp 5 to strike and maintain a stable electric discharge over a range of selectable power levels. Simultaneously, back-end rectifier 15 rectifies a predetermined amount of current from resonant circuit 13 and provides it to lamp 5, adding to the current flow therethrough a dc component selected to minimize striations and anode oscillations.

Figure 2A:
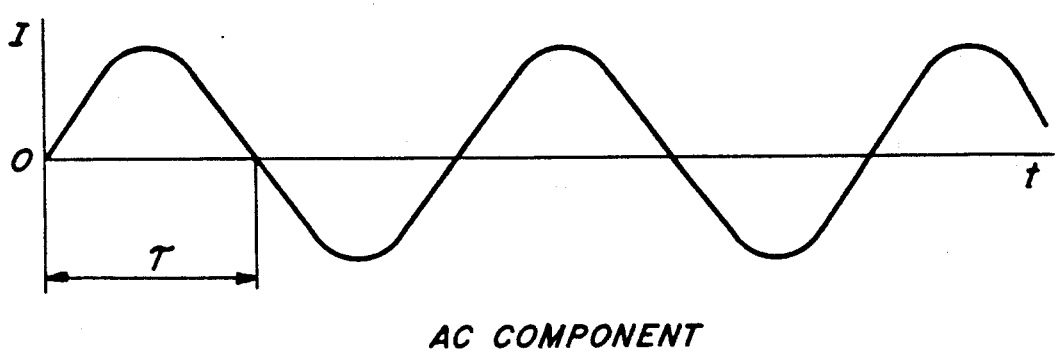
FIG. 2 is a graph composed of FIGS. 2A, 2B and 2C which illustrate the various currents related to a compact fluorescent lamp according to the present invention.

FIG. 2A shows the ac component of current flow through a compact fluorescent lamp according to the present invention. The half-period t is determined by the frequency of the sinusoidal current and is preferably shorter than the recombination time of the gas plasma ($\sim 100\mu s$) in order to sustain the electric discharge without flicker. The RMS value of ac current to the lamp substantially determines the power and, therefore, the brightness of the lamp and is preferably adjustable from about 1 to 200mA.

Figure 2B:
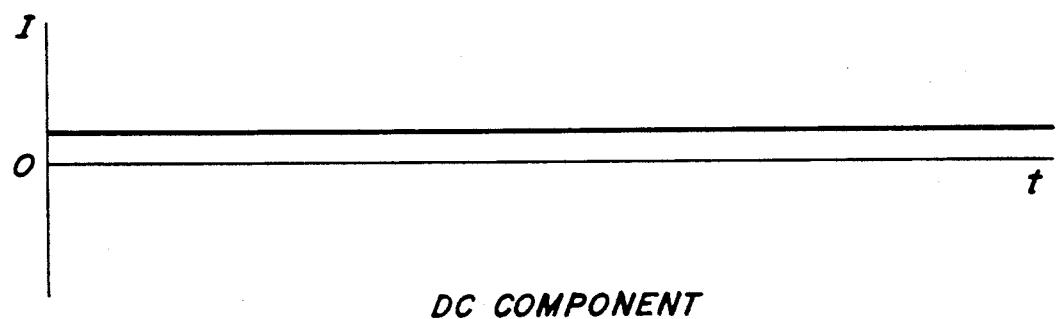

FIG. 2B shows the dc component of current flow through the lamp. For illustrative purposes, the magnitude of the dc component is exaggerated with respect to the ac component. As a practical matter, at full lamp power, the dc component may range from about 0.02 to 0.35% of the ac component; at minimum lamp power, a dc component of about 5% to 50% of the resultant current is preferred.

Figure 2C:
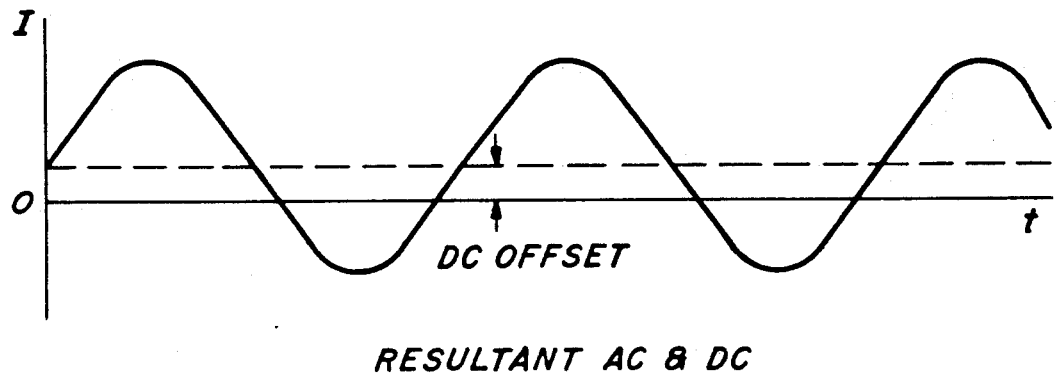

FIG. 2C shows the total current waveform that flows through the lamp. The dc component offsets the ac component from the zero current level, causing a slightly asymmetric resultant current waveform that substantially reduces lamp striations.

Figure 3:
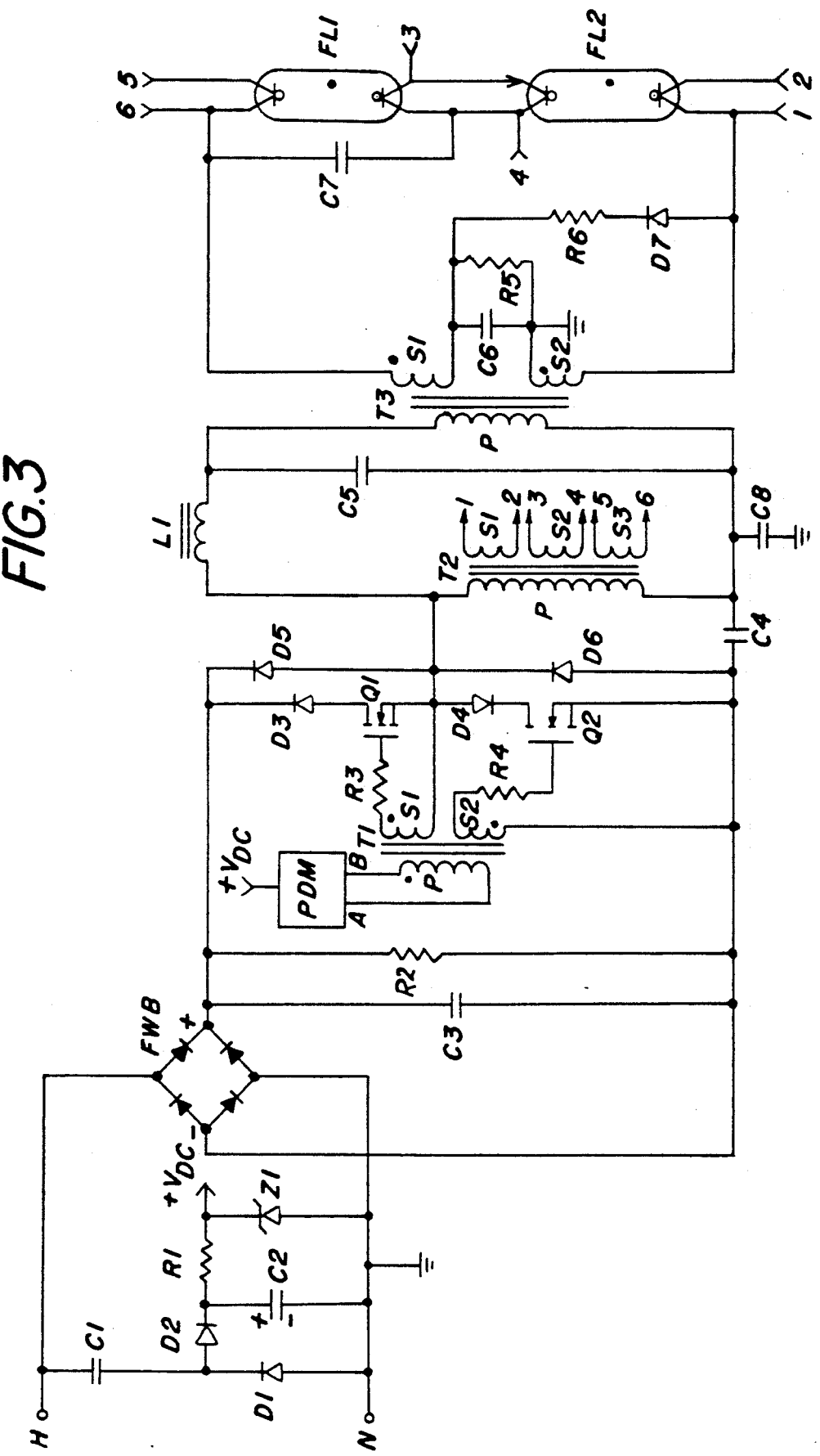
FIG. 3 is a circuit schematic of a dimming circuit of the present invention.

FIG. 3 is a circuit schematic of the dimming circuit of the present invention. The circuit operates as follows:

ac voltage is provided from a power source across hot (H) to neutral (N). Diodes D1 and D2, resistor R1, capacitors C1 and C2, and zener diode Z1 comprise a low voltage dc power supply. During each positive voltage half-cycle, current flows from hot through capacitors C1 and C2, and diode D2 to neutral, charging capacitor C2 plus(+) to minus(−), as shown. Resistor R1 and zener diode Z1 regulate the voltage on capacitor C2 so that the power supply is essentially a dc voltage source having a dc supply voltage equal to the breakover voltage of zener diode Z1 and an internal resistance essentially equal to R1. Diode D1 provides a discharge path for capacitor C1 during each negative voltage half-cycle.

Full-wave-bridge FWB rectifies ac voltage from the power source and provides pulsating dc voltage across the output terminals (+) and (−). Pulsating dc is filtered by capacitor C3, which is connected across the output terminals of the full-wave-bridge. Resistor R2 is connected in parallel with C3 and bleeds charge from it when power is removed. For purposes of this specification and the appended claims, when referring to electrical elements, the term "connected" means that there exists between two or more elements a conductive path, which may include additional elements not explicitly recited.

Diodes D3, D4, D5, and D6, MOSFETS Q1 and Q2, resistors R3 and R4, transformer T1, and capacitor C4 comprise a switching inverter for switching and inverting filtered dc voltage into a high frequency ac driving voltage. During operation, capacitor C4 charges up to approximately half of the voltage across capacitor C3. When Q1 is conductive, a driving voltage is applied across the primary winding P of transformer T2 that is positive and equal to the voltage across C3 less the voltage across C4 (approximately half the voltage across C3). When Q2 is conductive, the driving voltage is inverted and equal to the voltage across C4. When Q1 and Q2 are alternately switched at a high frequency (27kHz), rectangular pulses of ac driving voltage are produced having a peak-to-peak voltage substantially equal to the voltage across capacitor C3.

The driving frequency is preferably between 20kHz and 50kHz and is determined by the ac control voltage from the PDM circuit, discussed below. Frequencies below 20kHz are in the human audible range and are therefore undesirable. High frequencies (above 50kHz) are undesirable because they tend to cause high thermal dissipation in MOSFETS Q1 and Q2 and they lower the capacitive impedance of the fixture wires to each other and to ground.

Resistors R3 and R4 damp oscillations which may otherwise occur due to the leakage inductance of secondary windings S1 and S2 of transformer T1 and gate capacitance of MOSFETS Q1 and Q2. Diodes D3 and D4 block reverse current from flowing through MOSFETS Q1 and Q2, respectively. Diodes D5 and D6 provide a commutation path for current flowing through Q2 and Q1, respectively.

Q1 and Q2 could be any type of semiconductor switch, such as FETS or bipolar transistors; however, MOSFETS, as shown, are preferred because of their fast switching ability and their relatively low gate current requirements. Alternatively, the switching inverter may be replaced with a less-expensive semiconductor dc frequency converter, which converts a non-pulsating dc voltage into a high-frequency pulsating dc voltage. An inverting type of oscillating circuit, which converts dc to ac, is preferred, however, since it provides reduced peak magnetic flux in the core of the power-carrying transformers for the same amount of transformed energy and provides a more symmetric waveform.

Pulse duration modulation circuit PDM receives voltage (+VDC) from the dc power supply and provides an ac control voltage across the primary winding P of transformer T1 to control the conductivity of MOSFETS Q1 and Q2 and, accordingly, the duration of each rectangular pulse of driving voltage. Secondary windings S1 and S2 of transformer T1 are arranged so that voltage is applied to the gates of MOSFETS Q1 and Q2 in opposite polarities so that only one device may be conductive at any given time. Pulse-duration-modulated driving voltage is provided across primary P of transformer T2 and across the resonant circuit consisting of inductor L1 and capacitor C5 connected in series. The resonant circuit rings substantially sinusoidally at the driving frequency with an amplitude determined by the pulse duration of the driving voltage and the magnification factor Q of the resonant circuit. The magnification factor Q, in this case, is determined primarily by the impedance of lamps FL1 and FL2, which load the resonant circuit in parallel.

Loading the resonant circuit in parallel tends to stabilize operation of the gas discharge lamps. In particular, as current through the lamps increases, lamp impedance decreases, decreasing the magnification factor Q of the resonant circuit and, thereby, reducing its resonant response. Conversely, as the current through the lamps decreases, lamp impedance increases, increasing the magnification factor Q of the resonant circuit and, thereby, boosting its resonant response. The resonant circuit essentially behaves like an ac current source and provides high-frequency sinusoidal current through transformer T3 to lamps FL1 and FL2. The magnitude of the current is variable from about 1 to 200mA RMS, depending upon the pulse duration of the driving voltage, and is sufficient to strike and maintain an electric discharge in the lamps.

To further increase the stability of the resonant circuit, the frequency of the driving voltage (27kHz) is less than the peak response frequency of the resonant circuit (33kHz). Alternatively, damping could be added to the resonant circuit, reducing the magnification factor Q; however, this would reduce its efficiency and generate unwanted heat.

Capacitor C6, resistors R5 and R6, and diode D7 form a back end rectifier circuit for providing dc current through lamps FL1 and FL2 in series. Capacitor C6, connected between secondary windings S1 and S2 of transformer T3, is selected to pass substantially all high-frequency sinusoidal current from the resonant circuit to lamps FL1 and FL2. Resistor R6 allows dc current to flow through diode D7, providing a dc offset to capacitor C6 so that the sinusoidal current through C6 and lamps FL1 and FL2 receives a dc component of current, as determined by resistor R6. Resistor R5 is essentially a bleeder to discharge capacitor C6 when power is removed. Resistor R5 also limits the amount of dc offset on capacitor C6 when the impedance of the lamps increases (at low power levels). Earth ground is referenced between secondary windings S1 and S2 of transformer T3. The relative sizes of the secondary windings are selected to provide sufficient voltage with respect to ground to strike lamps FL1 and FL2 through the capacitance to ground of each lamp. They are also selected to balance the ground currents through each lamp so that the high frequency sinusoidal current energizes the lamps equally. In this particular circuit, a compromise is necessary to achieve sufficient striking voltage and, thus, the ground current through lamp FL1 is slightly larger than that through FL2. To correct for this imbalance, capacitor C7 is provided in shunt with lamp FL1 to provide compensating current to lamp FL2. Capacitor C8 prevents high-frequency switching noise from MOSFETS Q1 and Q2 in the switching inverter from adversely affecting the light output of lamps FL1 and FL2 or creating radio frequency interference (RF1).

Secondary windings S1, S2, and S3 of transformer T2 provide voltage to the filaments of lamps FL1 and FL2 to heat them. Primary winding P of transformer T2 receives pulse-duration-modulated voltage from the switching inverter circuit including MOSFETS Q1 and Q2. In addition, after Q1 is turned off and before Q2 is turned on, current through Q1 and inductor L1 commutates through diode D6, turning it on. This provides across primary winding P of transformer T2 an additional pulse of voltage, having an amplitude equal to the voltage across capacitor C4. Once the voltage across capacitor C5 reaches its peak, current reverses through inductor L1, and capacitor C5 discharges, turning diode D5 on. This provides across primary winding P a second pulse of voltage, having an amplitude equal and opposite to that of the first pulse. The two additional voltage pulses substantially occupy the period of time after Q1 is turned off and before Q2 is turned on. The circuit behaves similarly during the period after Q2 is turned off and before Q1 is turned on. The resultant high-frequency voltage across primary winding P has an RMS value that is substantially constant throughout the dimming range of the lamps. Thus, secondary windings S1, S2, and S3 also provide constant RMS voltage to heat the filaments of lamps FL1 and FL2 throughout the dimming range.

As shown in FIG. 3, each of the transformers T1, T2 and T3 comprises a ferromagnetic core, which is indicated by the pair of parallel lines between the primary and secondary windings of each of transformers T1, T2 and T3. Unless otherwise noted herein, all transformers include a ferromagnetic core.

Preferably, although not necessarily, the turns ratio of the secondary windings, S1 and S2, to the primary winding P of transformer T3 is approximately 6:1. Preferably, although not necessarily, the turns ratio of the first portion S1 of the secondary winding to the second portion S2 of the secondary winding of transformer T3 is about 9:4.

Figure 4A:
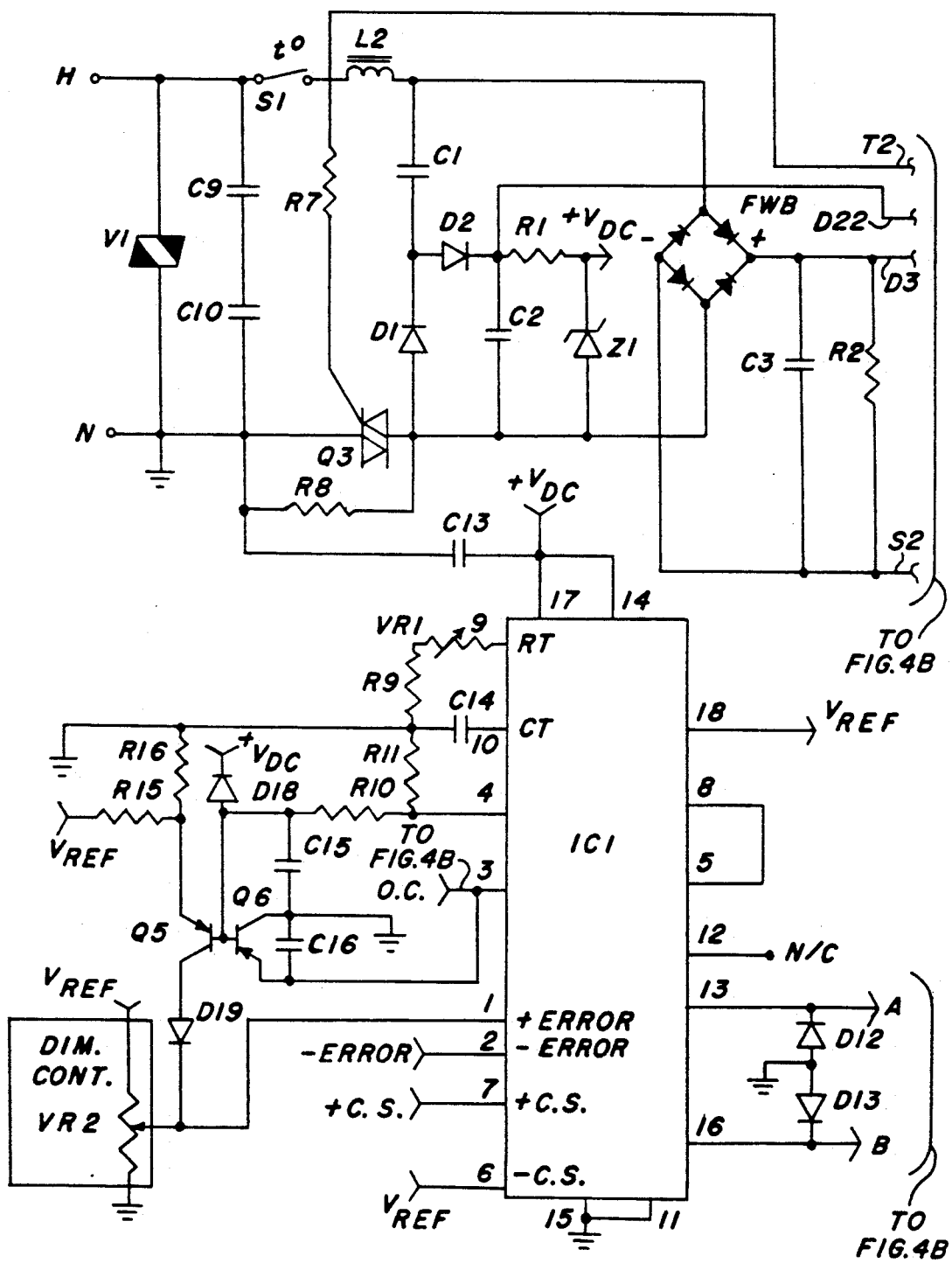
FIG. 4 is composed of FIGS. 4A and 4B showing a circuit schematic of another embodiment of the present invention.
Figure 4B:
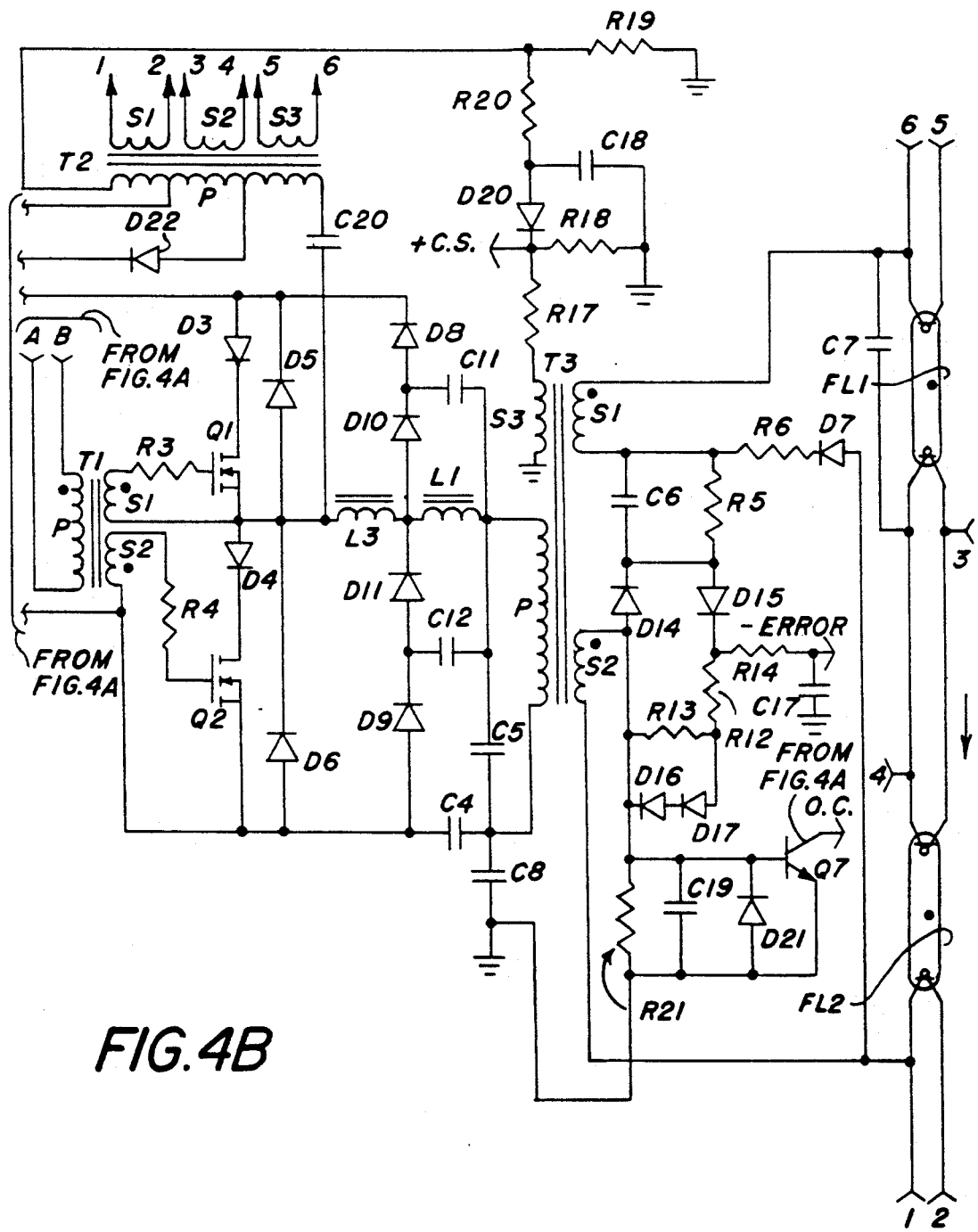

FIG. 4 is composed of FIGS. 4A and 4B showing a circuit schematic of another embodiment of the dimming circuit of the present invention. Identically labeled components correspond to those shown in FIG. 3. The front end of the circuit includes a high-power-factor power supply circuit. Specifically, the circuit of Fig. 3 has been modified to include inductor L2. The resonant action of inductor L2 with capacitor C1 improves the power factor of the supply circuit by allowing the circuit to draw a more nearly sinusoidal current from the 120V line with a reduced phase shift. For purposes of this specification and appended claims, the term "power factor" is defined as the ratio of real power to apparent power. Real power is the power actually consumed by the circuit and the lamps; apparent power is the product of RMS voltage and RMS red. The resonant frequency of capacitor C1 and inductor L2 is preferably between approximately three to six times line frequency, or 180-360Hz for a 60Hz line.

A similar circuit for improving power factor is described in U.S. Pat. Np. 4,222,096, issued Sep. 9, 1980 to Capewell, incorporated herein by reference. Unlike the Capewell patent, however, the present invention connects capacitor C1 (element 56 in FIG. 5 of the Capewell patent) to neutral through a half-wave rectifier and low-voltage DC power supply consisting of diodes D1 and D2, zener diode Z1, resistor R1, and capacitor C2, the operation of which was described previously. The voltage drop across this low voltage supply is preferably small enough so it does not disrupt the power-factor-correcting operation of inductor L2 and capacitor C1. This low-voltage supply provides substantially non-pulsating dc voltage (+Vdc) to control circuitry, which will be described later. For purposes of this specification and appended claims, voltages below about 40V will be referred to as "low voltages". Voltages above about 40V will be referred to as "high voltages".

Metal oxide varistor V1 protects the dimming circuit from line disturbances by clamping spurious voltage spikes to non-damaging levels. Capacitors C9 and C10 filter the power supply lines from hot to neutral to attenuate any conducted RF1 that the dimming circuit may generate. To assure high reliability, two capacitors are placed in series so that if one capacitor shorts, the other is sufficient to support full line voltage. Although not preferred, a single capacitor may optionally be used in place of capacitors C9 and C10.

Triac Q3 and resistors R7 and R8 limit current surges through full-wave-bridge FWB when line voltage is first applied across terminals H and N. Resistor R8 limits the current while capacitor C3 charges. After the dc side of FWB is sufficiently stabilized, gate drive is provided to Q3 through resistor R7 by transformer T2, the operation of which will be more fully described later.

Thermal cut-out switch S1 is a temperature activated switch that interrupts the flow of current through the dimming circuit when the temperature within the circuit housing exceeds a predetermined maximum temperature. The characteristics of the switch are selected so that it cuts out at temperatures above which would cause damage to the dimming circuit.

Operation of the rectifier circuit, consisting of full-wave-bridge FWB, capacitor C3, and resistor R2, is the same as was previously described in connection with FIG. 3. The inverter circuit, consisting of MOSFETS Q1 and Q2, diodes D3, D4, D5, and D6, resistors R3 and R4, transformer T1 and capacitor C4, operates essentially as was explained previously in connection with FIG. 3. Its operation will be discussed in more detail, below, to help manifest other aspects of the present invention described later.

FIG. 5 is a simplified schematic of the inverter circuit of FIGS. 3 and 4. During operation, capacitor C3 charges to approximately peak line voltage ($\approx$170V). Capacitor C4 charges to approximately ½ of this voltage and is preferably selected to exhibit little ripple voltage.

Figure 6:
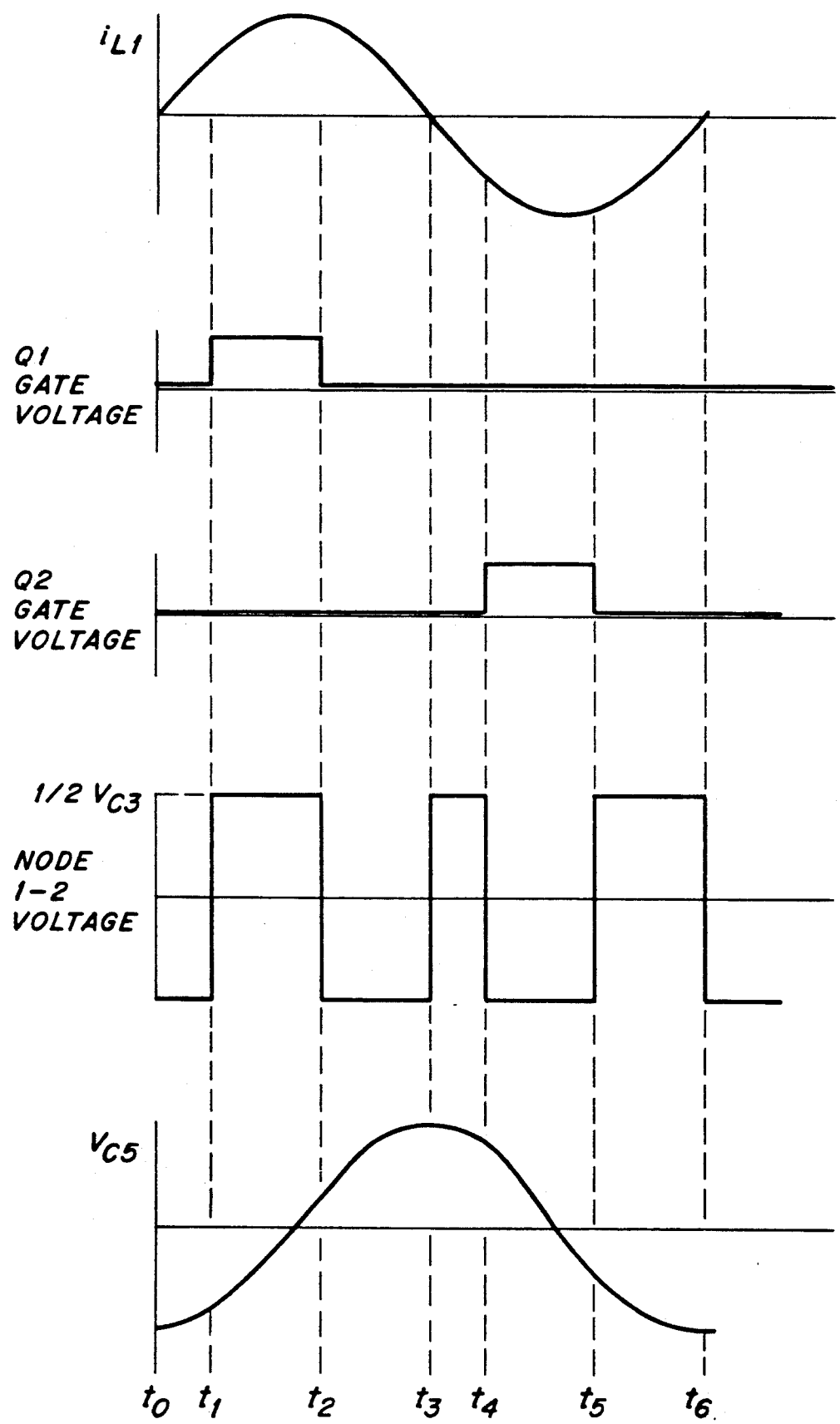
FIG. 6 is a graph showing the behavior of the inverter circuit of FIG. 5 over time.

FIG. 6 shows the behavior of the inverter circuit of FIG. 5 over one period of high-frequency ac current through inductor L1. At time t0, both MOSFETS Q1 and Q2 are non-conducting, the current (iL1) through inductor L1 is zero and capacitor C5 is charged to its negative peak. Between times t0 and t1, the current through inductor L1 increases substantially sinusoidally while the negative voltage across capacitor C5 rises towards zero, lagging the inductor current by about 90 degrees. Diode D4 blocks the inductor current from flowing through MOSFET Q2, and directs it through diode D6. While diode D6 is on, the voltage at node 1 (with respect to node 2) is clamped to the negative rail of the input voltage from capacitor C3. At time t1, MOSFET Q1 switches on, allowing the current through inductor L1 to commutate from diode D6 to MOSFET Q1. The voltage at node 1 is pulled up to the positive rail of the input voltage from capacitor C3. When MOSFET Q1 is switched off at time t2, the current through inductor L1 commutates to diode D6, pulling the voltage at node 1 back down to the negative rail.

The sum of the voltages across capacitors C5 and C4 appears across inductor L1 from t2 to t3, decreasing the current through inductor L1 to zero at time t3. At this point, the sum of the voltages across capacitors C5 and C4 is greater than the voltage across capacitor C3 and the current through inductor L1 reverses. Diode D5 turns on, pulling node 1 up to the positive rail. The inductor current is circulated through capacitor C3. At time t4, MOSFET Q2 turns on allowing the negative current that has built up in inductor L1 to commutate from diode D5 to MOSFET Q2. Node 1 drops back down to the negative rail. The negative half-cycle proceeds substantially the same as was explained for the positive half cycle, except that the functions of MOSFETS Q1 and Q2 and diodes D5 and D6 are reversed. For illustration, the current through inductor L1 is shown as being sinusoidal. In actuality, this waveform is somewhat distorted due to the pulse-duration-modulated driving voltage applied across the resonant combination L1 and C5.

For maximum efficiency, diodes D3 and D4 are preferably low-forward-voltage-drop Schottky type diodes. Fast recovery PN junction silicon type diodes may also be used, but will have higher power dissipation. Diodes D5 and D6 must withstand the full voltage across capacitor C3 and are preferably fast recovery PN junction silicon diodes. Optionally, diodes D3 D6 may be omitted if MOSFETS Q1 and Q2 were selected to contain fast recovery internal diodes. However, the circuit, as shown, is preferred because it employs more universally available components and provides for cooler operation of MOSFETS Q1 and Q2.

MOSFETS Q1 and Q2 may incur substantial switching losses at times t1, t2, t4, and t5 due to high voltages being applied across the MOSFETS as they are being switched on and off. A conventional dissipative snubber may be used to reduce power dissipation in the MOSFETS and, thus, provide cooler operation, but this will reduce the overall efficiency of the circuit as even more power is dissipated in the snubber. A variety of conventional snubber circuits are discussed in the *IEEE Power Electronics Soecialists Conference PESC '82 Record*, pp. 466-477, incorporated herein by reference.

The present invention accommodates both high efficiency and low power dissipation in MOSFETS Q1 and Q2. A "lossless" snubber circuit has been devised comprising inductor L3, diodes D8, D9, D10, and D11 and capacitors C11 and C12 as shown in FIG. 4. Although the snubber circuit invariably has some amount of power loss, for the purposes of this specification and appended claims it will be referred to as lossless since the losses associated therewith are not an essential part the circuit operation and are much smaller than the losses of conventional dissipative snubbers.

Figure 7:
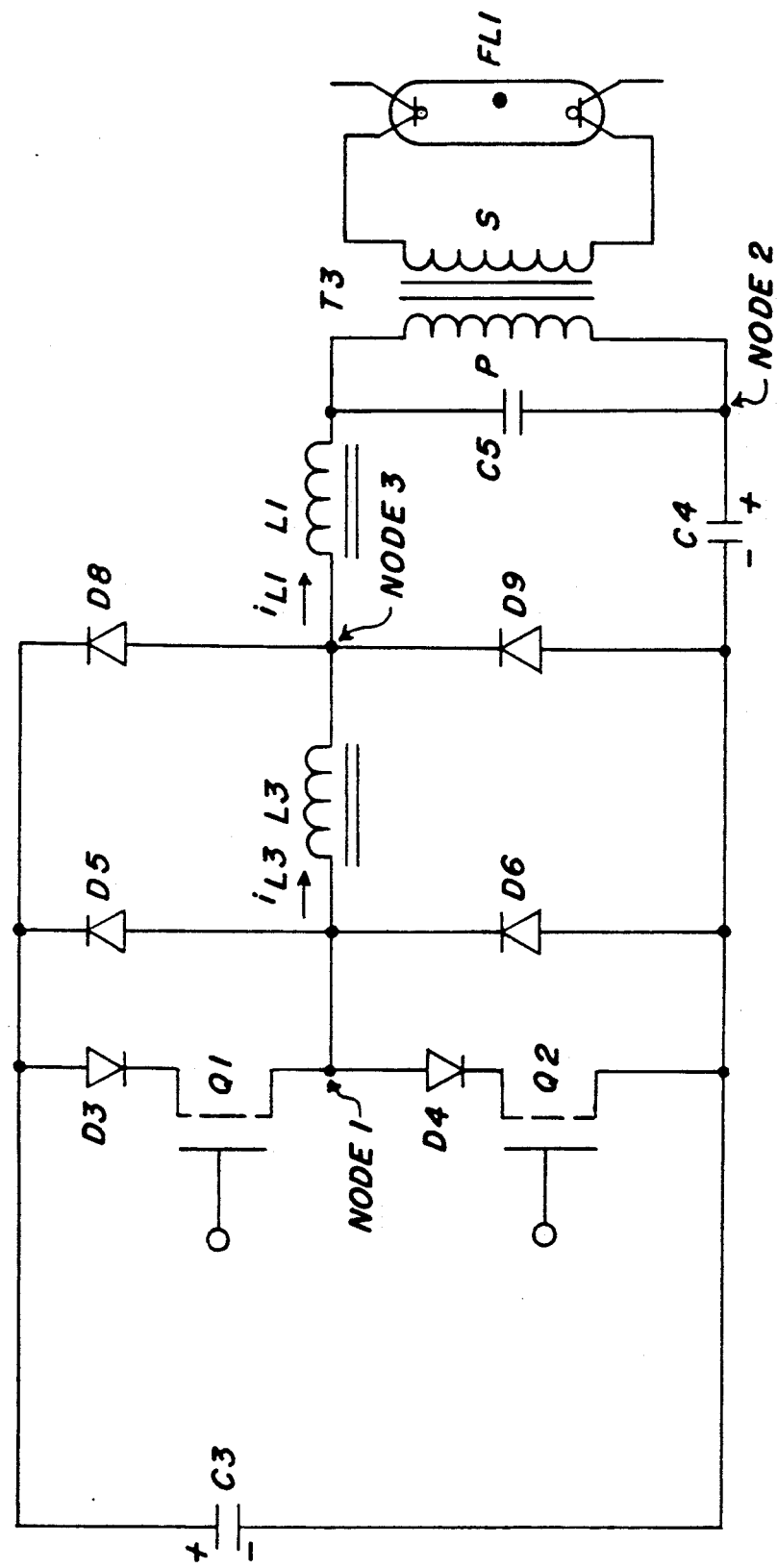
FIG. 7 is a circuit schematic of an inductive snubber circuit of the present invention.

The lossless snubber circuit consists of two parts; an inductive snubber to reduce losses during switch on of MOSFETS Q1 and Q2 and a capacitive snubber to reduce losses during switch-off. An inductive snubber circuit of the present invention is shown in FIG. 7 and its operation is described below.

Figure 8:
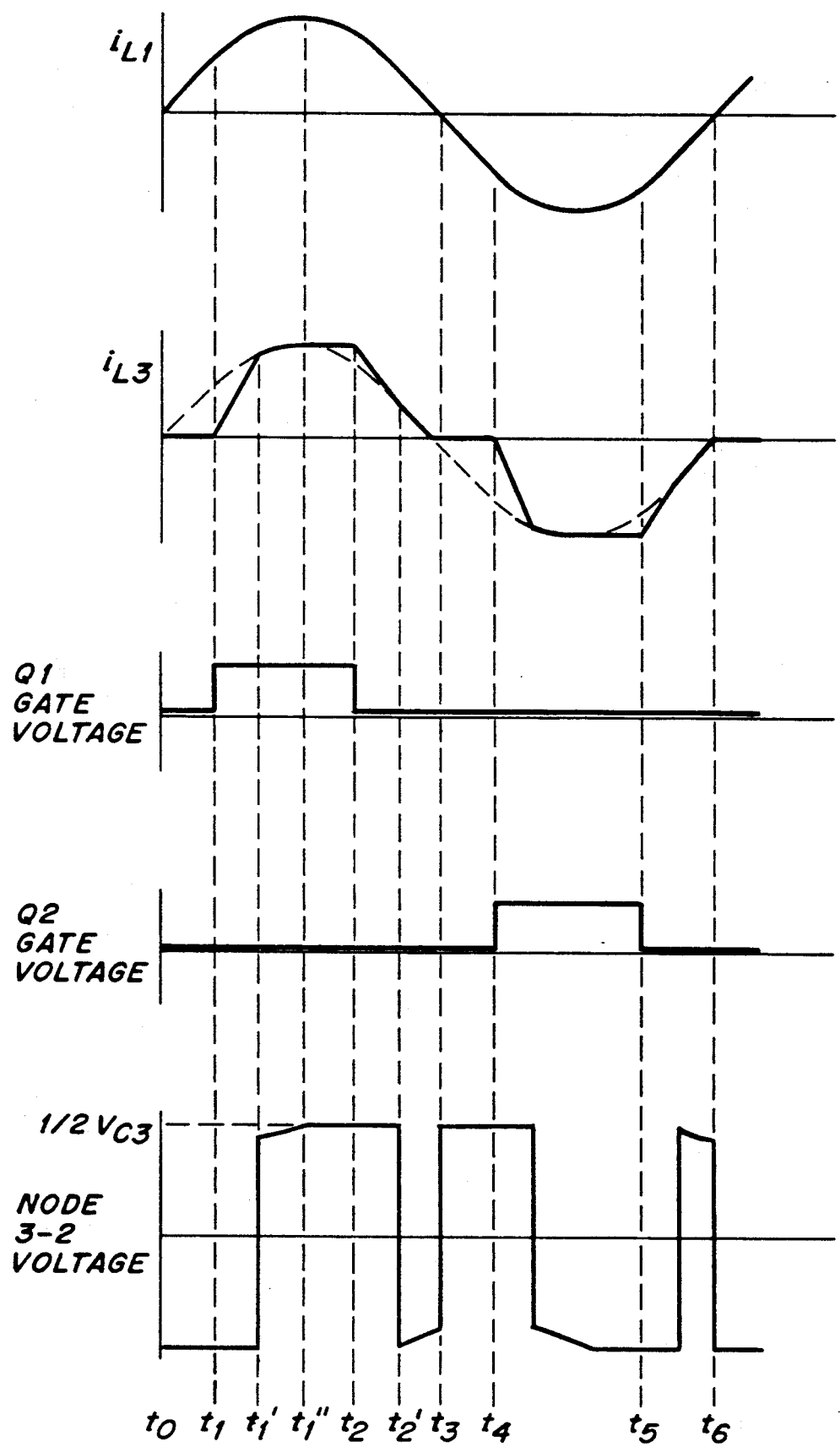
FIG. 8 is a graph showing the behavior of the snubber circuit of FIG. 7 over time.

Beginning with the positive half-cycle at time t0, capacitor C5 is initially charged to its negative peak and the current through inductors L1 and L3 is zero, as shown in FIG. 8. After time t0, negatively charged capacitor C5 begins drawing current through inductor L1. The current sinusoidally increases as energy is transferred from capacitor C5 to inductor L1. Diode D9 conducts substantially all of this current, pulling nodes and 3 down to the negative rail. Diode D6 turns on, but conducts only a small amount of current ($\approx$1-2mA) since the series impedance of diode D6 and inductor L3 is much larger than the impedance of diode D9. When the conductivity of MOSFET Q1 begins to change from substantially non-conductive to substantially conductive at time t1, diode D6 turns off and inductor L3 supports substantially the full voltage across capacitor C3. Thus, MOSFET Q1 supports essentially zero volts and has little current flowing therethrough while it is being switched on. MOSFET Q1 must initially conduct some current to provide for the reverse recovery of diode D6. This recovery time, however, is very short ($\approx$10nsec) due to the small amount of current being conducted by diode D6 at time t1. The reverse recovery time of diode D9 is much longer ($\approx$200nsec) because it is conducting much more current than diode D6. Inductor L3 reduces losses in diode D9 by limiting the current flow therethrough during this reverse recovery period. MOSFETS Q1 and Q2 preferably have switching times less than about 100nsec.

As a result of the circuit operating as explained above, MOSFET Q1 experiences switch-on losses for only about 10nsec while diode D6 is recovering. These losses may be reduced further if diode D6 is selected to have a forward conduction voltage that is less than that of diode D9. In this case, the current through diode D6 would be approximately zero at time t1 and there would be essentially no reverse recovery period.

From time t1-t1', the voltage across capacitor C3 is supported entirely by inductor L3. The inductor current (iL3) ramps up linearly until it is equal to the current through inductor L1 at time t1'. For illustration, the relative elapsed time between t1 and t1' is exaggerated. The actual time may comprise only about 1/20th of the half-cycle.

At time t1', diode D9 turns off and iL3 continues to follow iL1. When this current reaches its peak at time t1", the current through inductor L3 digresses from iL1 and continues at a substantially constant level from its peak. The differential current between inductors L1 and L3 circulates through diodes D8 and D3 and through MOSFET Q1. During this time, a small fraction of the energy stored by inductor L3 is dissipated in these elements and in the windings of the inductor itself. This is not an appreciable loss, however.

At time t2, MOSFET Q1 turns off and the current into inductor L3 from node 1 commutates to diode D6. When diode D6 turns on, the voltage across capacitor C3 is applied negatively across inductor L3. The current therethrough linearly decreases until it is equal to that of inductor L1 at time t2'. Again, the elapsed time between t2 and t2' is exaggerated for illustrative purposes. At time t2', diode D8 turns off and the current in both inductors rings down to zero as their energy is transferred to capacitor C5 and to lamp FL1 through transformer T3.

At time t3, the current through inductors L1 and L3 is zero and capacitor C5 is charged to its positive peak voltage. Operation of the inductive snubber circuit in the negative half-cycle of current flow through inductor L1 is similar to that described above for the positive half cycle.

In order for the snubber circuit of FIG. 7 to operate at maximum efficiency and to avoid adversely affecting the operation of any surrounding circuit elements, inductor L3 preferably has a smaller inductance than inductor L1. An inductance ratio of about 10:1 is preferred. Diodes D8 and D9, MOSFETS Q1 and Q2, and gate drive transformer T1 are preferably selected to have minimal stray capacitance to minimize the current flow through inductor L3 at the beginning of each half-cycle.

Figure 9:
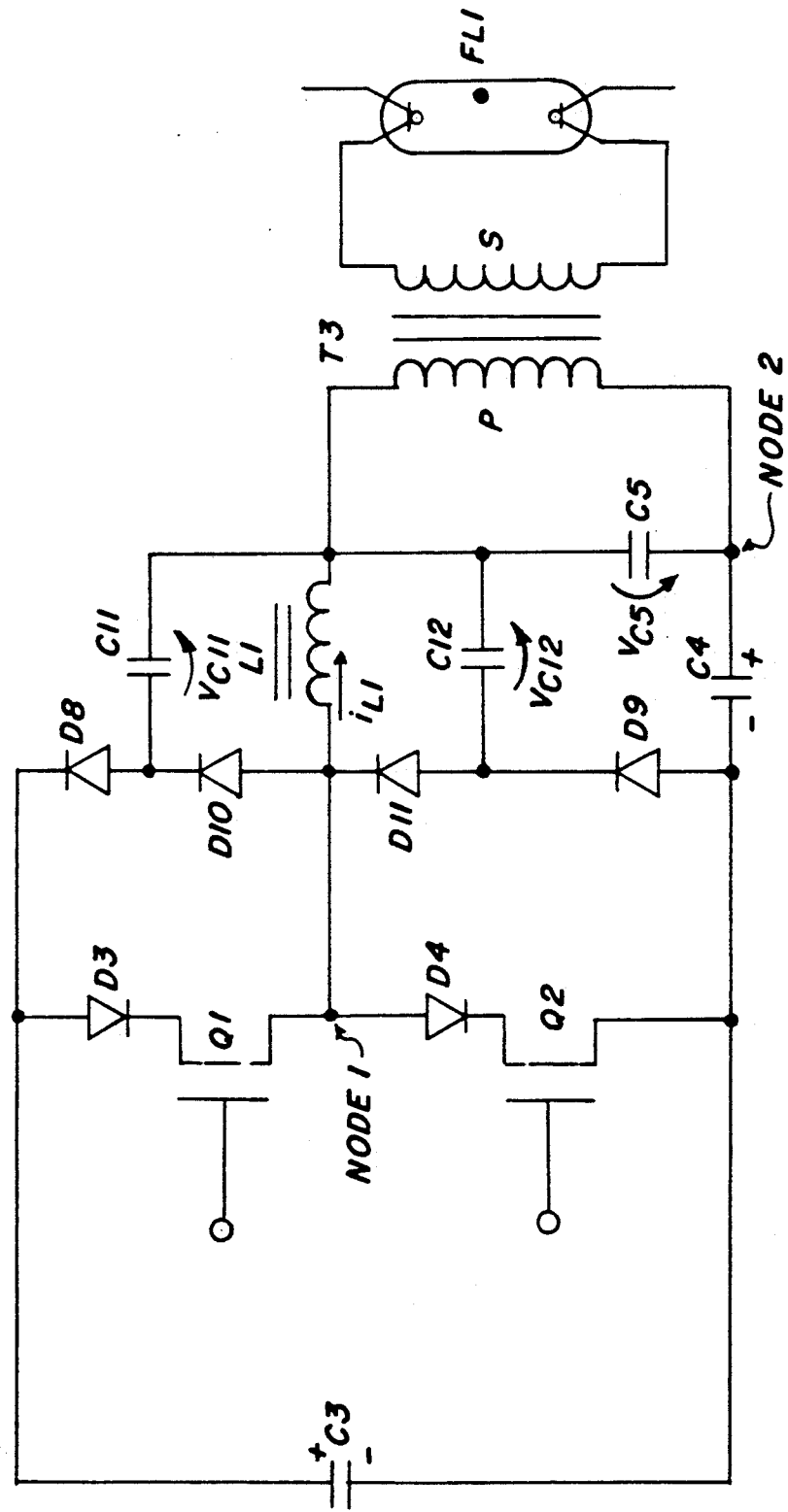
FIG. 9 is a circuit schematic of a capacitive snubber circuit of the present invention.
Figure 10:
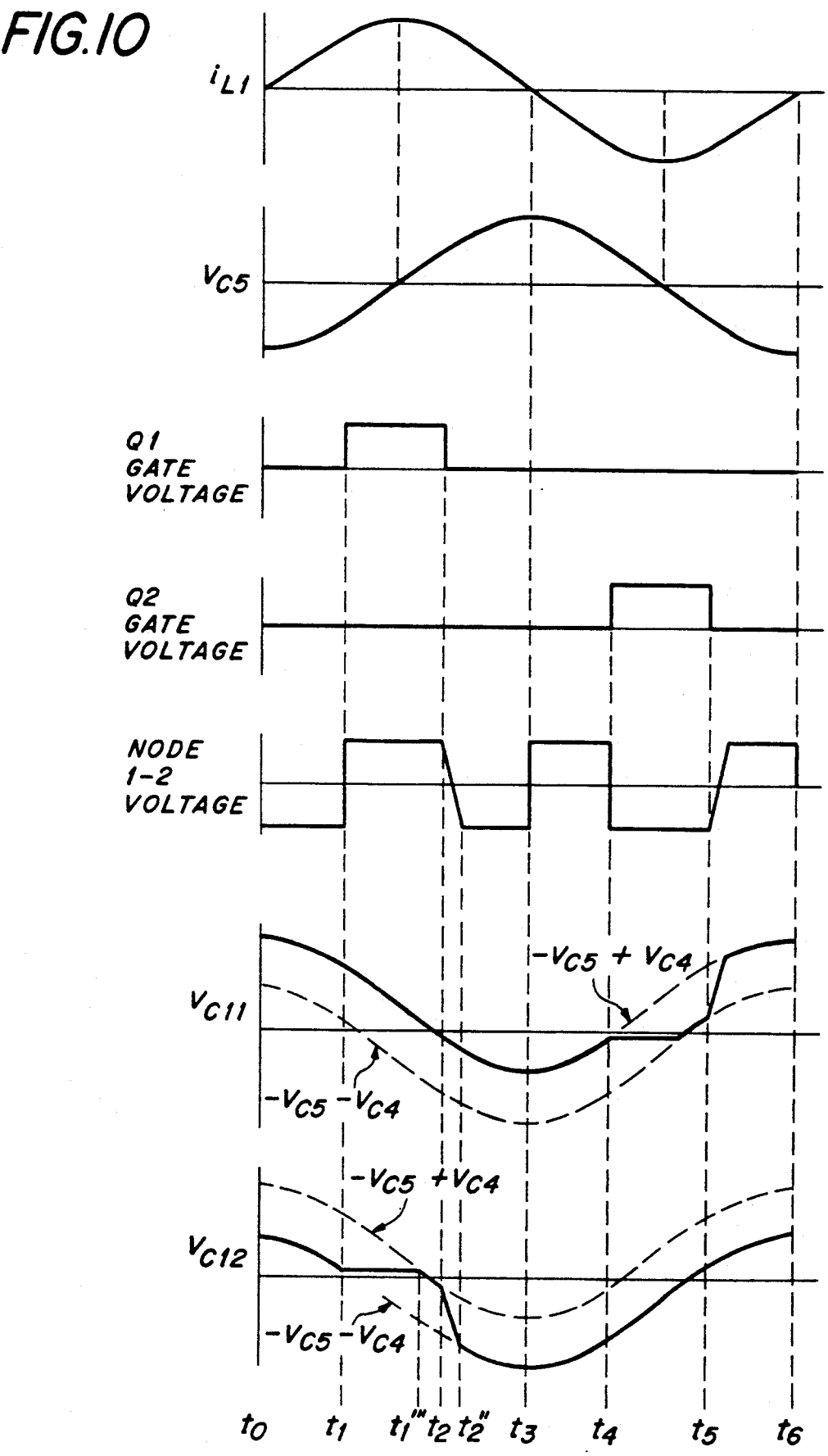
FIG. 10 is a graph showing the behavior of the snubber circuit of FIG. 9 over time.

FIG. 9 is a circuit schematic of a capacitive snubber circuit of the present invention. The capacitive snubber reduces thermal dissipation in MOSFETS Q1 and Q2 during switch-off and consists essentially of diodes D10 and D11 and capacitors C11 and C12. Operation of the circuit is as follows:

Starting with the positive half-cycle at time t0, the current through inductor L1 is initially zero and the voltage across capacitor C5 is at its negative peak, as shown in FIG. 10. As capacitor C5 draws current through inductor L1, node 1 is clamped to the negative rail and diodes D9 and D11 are on. The voltage across capacitor C12 must follow the negative sum of the voltages across capacitors C5 and C4, ($-Vc5-Vc4$) while diode D9 is on. At time t1, MOSFET Q1 switches on pulling node 1 back up to the positive rail and turning diode D9 and D1 off. The voltage across capacitor C12 remains constant from time t1 to t1'''. At time t1''', the voltage across inductor L1 is equal to the voltage across capacitor C12. This turns diode D11 on allowing capacitor C12 to discharge through inductor L1. The voltage across capacitor C12 follows the voltage across capacitor C3 less the sum of the voltages across capacitors C4 and C5, or: solving simultaneously:

(1) $Vc12 = Vc3 - (Vc4 + Vc5)$
(2) $Vc4 = 1/2\ Vc3$
$\overline{Vc12 = -Vc5 + Vc4}$ As MOSFET Q1 begins switching off at time t2, the current through inductor L1 immediately commutates through diode D11. At this point, the voltage across MOSFET Q1 is equal to the voltage across capacitor C3 less the sum of the voltages across capacitors C4, C5, and C12; or: solving simultaneously:

(1) $VQ1 = Vc3 - (Vc4 + Vc5 + Vc12)$
(2) $Vc12 = -Vc5 + Vc4$
(3) $Vc4 = 1/2\ Vc3$
$\overline{VQ1 = 0}$ Thus, the voltage at node 1 is supported at the positive rail and the voltage drop across MOSFET Q1 is approximately zero. This provides substantially non-dissipative operation during switch-off.

After time t2, capacitor C12 begins charging negatively as it receives energy stored in inductor L1. This voltage continues to increase negatively until it reaches the negative sum of the voltages across capacitors C4 and C5 at time t2". At this point, diode D9 turns on and Vc12 again follows −Vc5-Vc4.

After time t3, the voltage across capacitor C5 begins to fall, allowing capacitor C12 to charge through diode D9. Diode D9 remains conductive through time t6 and the voltage across capacitor C12 continues to follow −Vc5 −Vc4. The circuit operates substantially the same as described above for each negative half-cycle of current flow through inductor L1 except that snubbing is accomplished by capacitor C11. Capacitors C11 and C12 preferably have between about 1% and 5% of the capacitance of capacitor C5.

Referring to FIG. 4, more particularly to FIG. 4A, integrated circuit IC1 is preferably an industry-standard SG3526 pulse duration modulation (PDM) integrated circuit. Internal Operation of the integrated circuit is described in the Silicon General Product Catalog, 1989, Section 4, pp. 111-119, and Section 12, pp. 49-74, incorporated herein by reference. Pins 14 and 17 of IC1 are connected to +Vdc for receiving low voltage dc power from the dc power supply circuit described previously. Capacitor C13 is a bypass capacitor to help maintain a steady dc voltage on pins 14 and 17. Capacitor C14 and resistors R9 and VR1 are connected to an internal oscillator through pins 9 and 10 of IC1 and set the modulation frequency. The combination of resistor R9 and variable resistor VR1 may optionally be replaced with a single fixed resistor, but the combination, as shown, is preferred as it allows easy adjustment of the modulation frequency.

The output of IC1 consists of alternate pulses of positive voltage provided on pins 13 and 16 (outputs A and B). This pulsating voltage is provided across input terminals A and B of transformer T1 and controls the conductivity of MOSFETS Q1 and Q2. The duration of each pulse is preferably variable from zero to about 18μs, the maximum pulse duration that still allows some dead time between pulses at the preferred modulation frequency (=27KHz). This dead time can be increased by connecting an optional resistor (not shown) between pin 11 and ground. Diodes D12 and D13, preferably Schottky diodes, prevent outputs A and B, respectively, from being pulled excessively negative by the magnetizing current of transformer T1.

Integrated circuit IC1 preferably includes an error amplifier for providing feedback control of the current through lamps FL1 and FL2. To the negative side of the error amplifier is provided a voltage (−ERROR) that corresponds to the actual lamp current. To the positive side of the error amplifier is provided control voltage (+ERROR) set by potentiometer VR2, which may be part of a dimming control, as shown. The output of the error amplifier controls the pulse duration of outputs A and B and, thus, controls (see FIG. 4B) current through lamps FL1 and FL2. Vref is a tightly regulated 5V supply produced on pin 18 of integrated circuit IC1 (see FIG. 4A).

A current sensing circuit, comprising diodes D14, D15, D16, and D17, resistors R12, R13, and R14 and capacitor C17 provides a voltage (−ERROR) that is indicative of the lamp current. The current sensing circuit operates as follows: During each positive half-cycle of current flow (iFL) through lamps FL1 and FL2, current flows through capacitor C6 and diode D14. During each negative half-cycle, current flows through capacitor C6, diode D15, resistor R12 and either resistor R13 or series connected diodes D16 and D17.

At low current levels, the voltage drop across resistor R13 is too small to turn on diodes D16 and D17. In this case, the voltage (−ERROR) varies proportionally with the lamp current and the sum of the resistances R12 and R13. At larger currents, diodes D16 and D17 turn on and provide a substantially constant voltage drop that is independent of the lamp current (iFL). The voltage (−ERROR) in this case, varies proportionally with the lamp current and the resistance R12.

Figure 11:
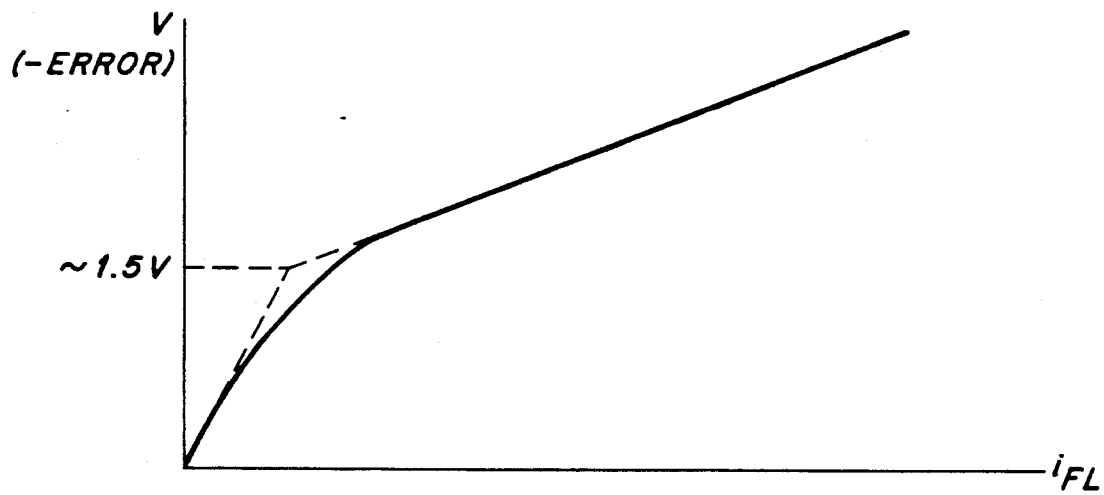
FIG. 11 is a graph showing preferred characteristics of a current sensing circuit of the present invention.

FIG. 11 shows the resulting relationship between lamp current (iFL) and the feedback voltage (−ERROR). The dual slope characteristic of this relationship allows for high sensitivity and tight control of lamp current at low current levels and low power dissipation in the sense resistors at high current levels. Resistor R12 preferably has less resistance than resistor R13. A resistance ratio of about 4:1 is preferred for full-range control of most types of compact fluorescent lamps. Diodes D14 and D15 are preferably fast recovery diodes. Resistor R14 and capacitor C17 increase the stability of the feedback control system by attenuating any ac voltage components provided to pin 2 of integrated circuit IC1.

Capacitor C15 and C16, transistors Q5 and Q6, resistors R10 and R11, and diodes D18 and D19 comprise a "soft-start" circuit. This circuit provides favorable lamp operating conditions upon start-up to reduce transient stresses. The circuit operates as follows: Initially, capacitor C15 is uncharged and the voltage on pin 3 is zero. When power is applied to the dimming circuit, pin 4 of IC1 rises to nearly 5V and capacitor C15 gradually begins charging through resistor R10. Transistor Q6 clamps pin 3 to a voltage slightly above the voltage on capacitor C15. Pin 3 is an override control terminal (O.C.), which allows direct control over outputs A and B of IC1. As capacitor C15 continues to charge to higher voltages, pin 3 follows, increasing the pulse duration of outputs A and B until the voltage across lamps FL2 and FL2 is sufficient to strike them. After the lamps are struck, capacitor C15 either continues to charge or discharges until the current through the lamps reaches a steady state level corresponding to the control voltage (+ERROR) on pin 1.

To assist in striking the lamps when this control voltage is below about 1.5V, transistor Q5 injects current through diode D19 to raise, momentarily, the voltage on pin 1 of IC1. This increases the duration of each pulse and, thus, the RMS voltage to the lamps ensuring that they strike. Once the voltage across capacitor C16 reaches the voltage between voltage dividing resistors R15 and R16, transistors Q5 and Q6 turn off. Pin 1 drops to a voltage set by potentiometer VR2. Diode D19 prevents current from flowing backwards through the collector of transistor Q5. Diode D18 allows capacitor C15 to discharge when power is removed. Resistor R11 is connected to ground to insure that capacitor C15 can discharge completely.

Integrated circuit IC1 preferably includes a circuit shutdown comparator with positive and negative inputs (±C.S.) formed across pins 7 and 6, respectively. If faulty or worn out lamps are connected to the dimming circuit or if a lamp is removed while it is energized, voltage and current in the resonant circuit could build to damaging levels. This can cause high dissipation in MOSFETS Q1 and Q2 and produce excessive voltage stresses on capacitors C4, C5, C11, and C12 and on transformer T2. To prevent this from occurring, an auxiliary winding (S3) is provided on transformer T3 to sense the voltage on the primary winding P. Resistors R17 and R18 divide this voltage and provide it to the positive input (+C.S.) of the circuit shutdown comparator. The negative input (−C.S.) is tied to a reference voltage Vref. The circuit shutdown comparator will trip when the voltage between resistors R17 and R18 becomes larger than Vref. This corresponds to a voltage across lamps FL1I and FL2 that is significantly higher than their combined design strike voltages. When the shutdown comparator is tripped, outputs A and B are pulled low thereby protecting the circuit from damage.

In a similar manner, resistor R19 senses the current through the primary winding (P) of transformer T2 to prevent excessive currents from damaging the circuit if it is accidentally miswired. Voltage dropped across resistor R19 is divided by resistors R20 and R18 through diode D20. This voltage is provided to the positive input (+C.S.) of the circuit shutdown comparator. The shutdown comparator trips when the current through transformer T2 is significantly larger than its normal operating current. Capacitor C18 smooths out the +C.S. voltage to prevent false triggering due to transient noise.

For safety purposes, the control system of the present invention is further equipped with a ground-fault protection circuit. The circuit includes resistor R21, capacitor C19, diode D21 and transistor Q7. If one of the lamp terminals is accidentally shorted to ground, current must flow through resistor R21 to complete the circuit around the secondary windings. The voltage developed on resistor R21 forward biases the base-emitter junction of transistor Q7 turning it on. This allows capacitor C19 to discharge partially, pulling the voltage on the override control terminal pin 3 (0.C.) down with it. The pulse duration of outputs A and B decreases, reducing the voltage on the secondary windings of transformer T3. This voltage continues to decrease until the ground-fault current through resistor R21 is just sufficient to develop enough voltage at the base of transistor Q7 to turn it on. Resistor R21 is preferably sized so normal ground currents due to capacitance in the lamps and wiring will not turn on transistor Q7. Capacitor C19 filters the voltage across resistor R21 to prevent false tripping of transistor Q7 due to transient noise. Diode D21 protects the base of transistor Q7 from excessive reverse bias.

To accommodate a variety of lamps and fixtures, secondary windings S1 and S2 of transformer T3 are preferably reconfigurable as shown in FIG. 12. A single printed circuit board preferably has multiple connection points for receiving different combinations of connecting jumpers. In the preferred embodiment, secondary windings S1 and S2 have 208 and 92 turns, respectively.

Figure 12A:
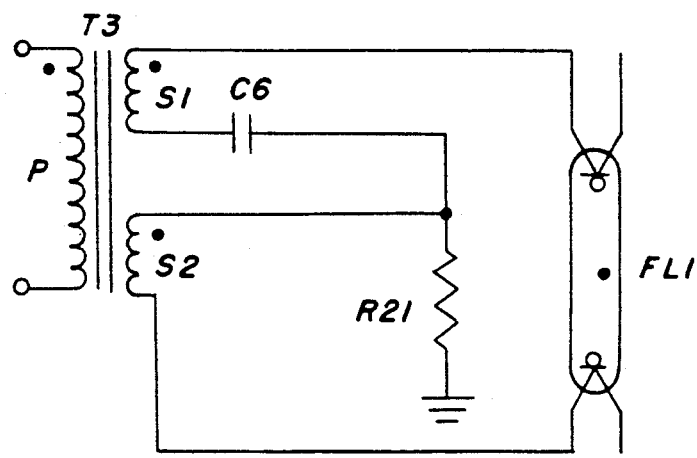
FIGS. 12a through 12e are circuit schematics showing additional embodiments of the present invention.

The configuration shown in FIG. 12A provides a full 300 turns of voltage across lamp FL1 to accommodate lamps with high operating voltages. The point between the two windings is referenced to ground through resistor R21. Although shown as a single lamp, fluorescent lamp FL1 may be two or more lamps in series. In the case where two lamps are used in series, grounding the point between the secondaries is beneficial in balancing the light output of each lamp at low light levels, as explained previously in connection with FIG. 1.

Figure 12B:
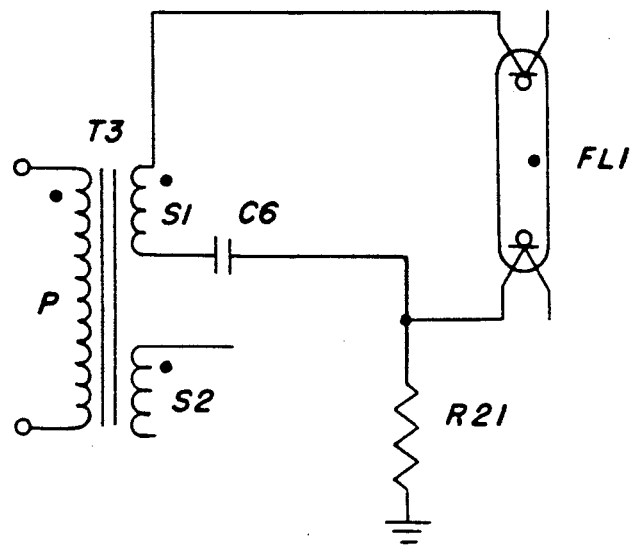

The circuit configuration of FIG. 12B provides 208 turns of voltage to the lamp. This configuration is advantageous over that of FIG. 12A for operating high current lamps as it requires lower currents through primary winding P for a given lamp wattage.

Figure 12C:
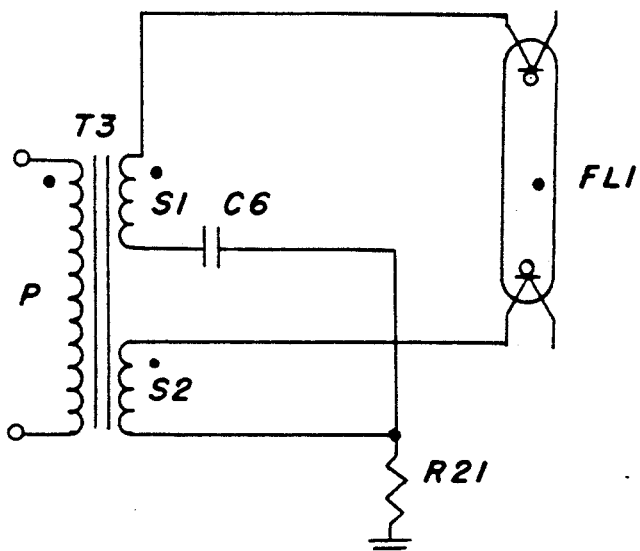
Figure 12D:
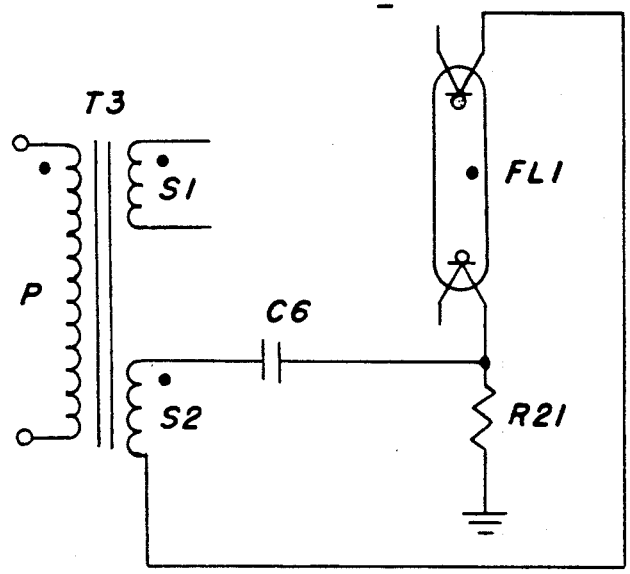

The circuit of FIG. 12C provides 116 turns of voltage across the lamp (208 minus 92). FIG. 12D provides 92 turns of voltage across the lamp. Both configurations are useful for operating low voltage lamps, although the configuration of FIG. 12C is preferred over that of FIG. 12D because it provides a higher striking voltage to ground.

Figure 12E:
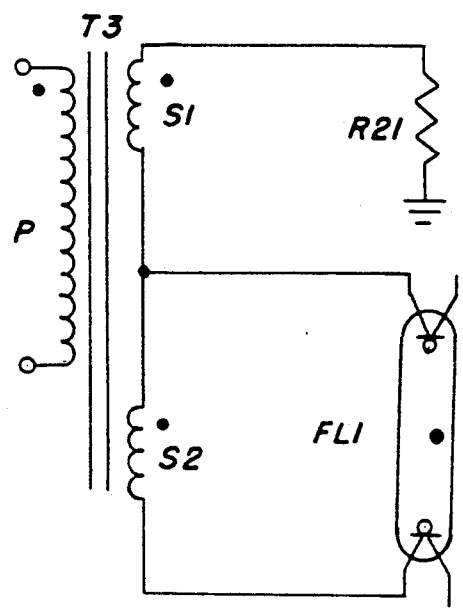

The circuit of FIG. 12E is similar to that of FIG. 12D except that ground is referenced to one end of secondary winding S1. This boosts the striking voltage substantially, allowing this circuit to be used for lamps having low operating voltages, but high striking voltages.

Transformer T2 provides voltage to heat the filaments of lamps FL1 and FL2. The primary winding (P) is provided with two additional taps. One is connected through resistor R7 to the gate of triac Q3 to turn it on after the switching inverter circuit is energized. The other tap is connected through diode D22 to capacitor C2. This provides additional current to the low voltage dc regulator if the current through capacitor C1, alone, is insufficient. Capacitor C20 is provided in series with primary winding (P) of transformer T2 to block line frequency voltage pulses from saturating its core.

Since the present dimmer is intended to operate at low current levels, representing small percentages of full light output, there may be instances where the capacitance of the wiring between the dimming circuit and the lamp fixtures draws from the power supply a capacitive current having an amplitude approximately the same as the amplitude of the in-phase lamp current at low light output levels. The term "in-phase lamp current" means the current from the power supply which flows through the lamp and is in-phase with the output voltage of the power supply. At high output levels, where larger currents are supplied to the lamps, any capacitive current drawn by the wiring is usually insignificant in relation to the lamp current. However, at low output levels, the current supplied by the dimming circuit power supply could be as low as one milliamp. It is not unusual for the wiring to draw a milliamp of capacitive current. In such a case, all of the current drawn from the dimming circuit would be capacitive, rather than in-phase, which could result in the dimmed lamp flickering or intermittently dropping in and out (i.e., blinking on and off). To avoid such an undesirable result, the present invention includes a sensing circuit for sensing the in-phase lamp current while ignoring out-of-phase currents. The current output of the dimming circuit is adjusted to maintain the desired level of in-phase current to the lamp, and thus lamp power, regardless of any wiring capacitance.

Figure 13:
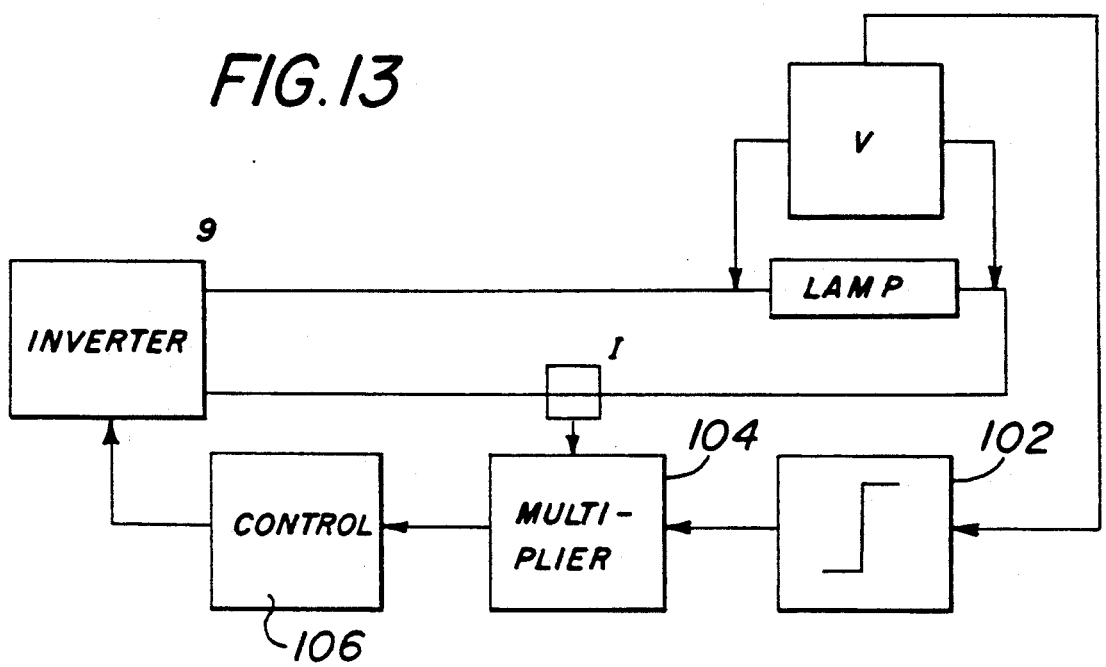
FIG. 13 is a simplified block diagram for a circuit to detect and compensate for capacitive current at low current levels.

A preferred embodiment of such a circuit is illustrated in block diagram form in FIG. 13. In FIG. 13, the inverter 9 is illustrated as connected directly to the lamp, although it should be understood that the inverter supplies current to the lamp through a transformer, as described in greater detail below. In FIG. 13, a voltage sensor V and a current sensor I are provided to sense the voltage across the lamp and the current through the lamp at any given instant. The output of the voltage sensor V forms the input to a circuit 102, the output of which is a "1" when the input is positive and "0" when the input is negative. Thus, circuit 102 can be any circuit which implements the "Heaviside" function. The output of circuit 102 and the output of current sensor I form the inputs to a multiplier circuit 104, where they are multiplied. The output of multiplier 104 will be zero whenever the output of circuit 102 is zero, and will be the output of current sensor I when the output of circuit 102 is "1". Thus, the output of multiplier 104 can be used to determine the magnitude of the in-phase current to the lamp.

Figure 14:
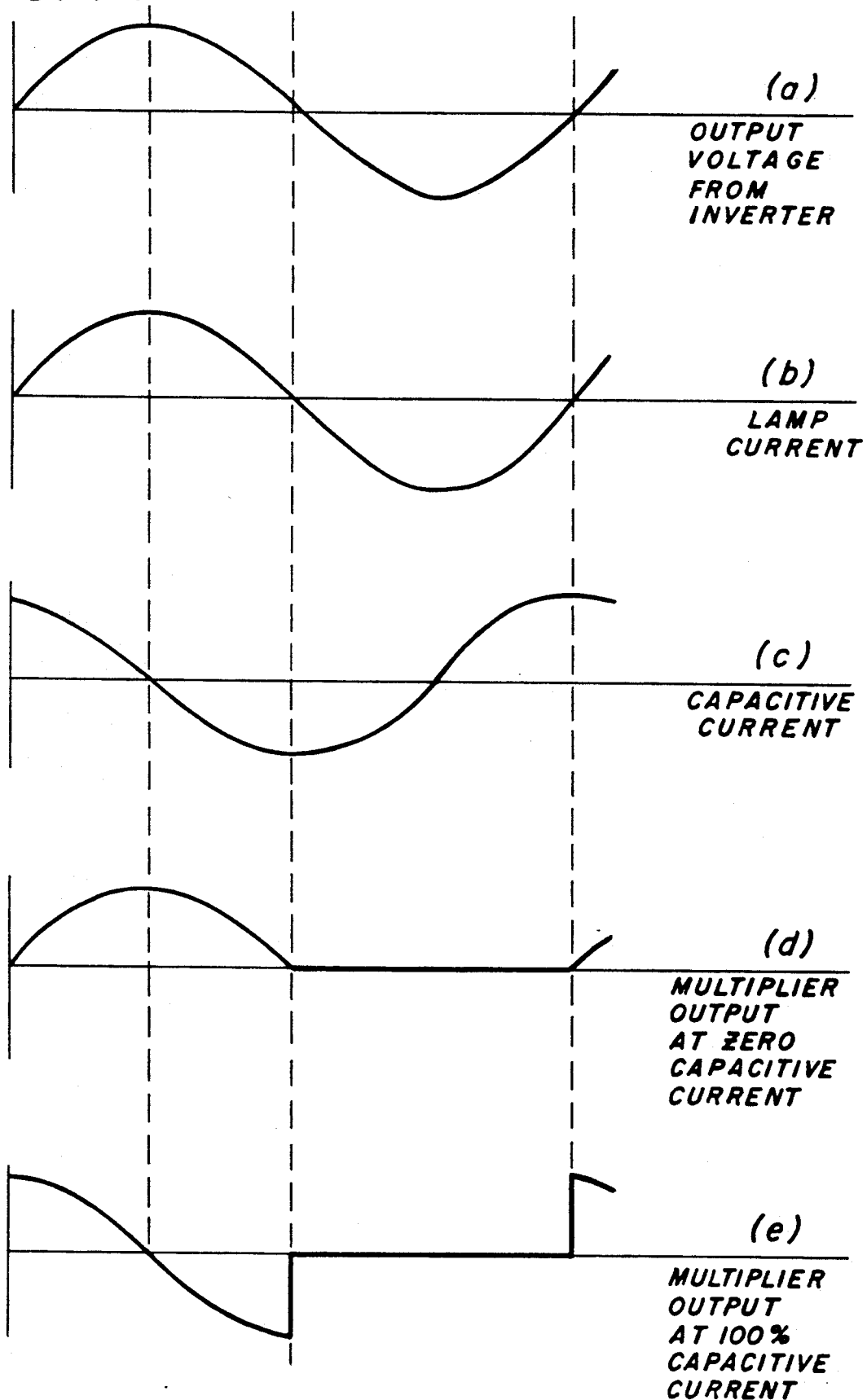
FIGS. 14(a)-14(e) illustrates the behavior of the circuit of FIG. 14 over time.

Referring to the waveforms in FIG. 14, waveform (a) illustrates the output voltage from the inverter and waveform (b) illustrates the in-phase lamp current. Waveform (c) illustrates capacitive current drawn from inverter 9. Capacitive current (c) leads the in-phase lamp current by 90°. Waveform (d) illustrates the output of multiplier 104 for the ideal case of zero capacitive current. In that case, all of the current drawn from inverter 9 is in-phase and flows through lamp. Waveform (e) illustrates the output of multiplier 104 for the extreme opposite case where all of the current drawn from inverter 9 is capacitive. In that case, none of the current is available to the lamp. In most cases, the current drawn from inverter 9 will be somewhere between these two extremes, and the phase relationship between lamp voltage and current will vary between zero and 90°. By monitoring a number of cycles of the multiplier output and computing an average dc level of the multiplier output, the level of in-phase current can be determined. An average dc level can be computed in a control circuit 106. The details of control circuit 106 are not described here, since the required control circuit can be readily implemented by one skilled in the art and, in any case, the details of the control circuit are not crucial to the present invention. The output of the control circuit 106 can be used to control the inverter output via the pulse duration modulator, as previously described.

Figure 15:
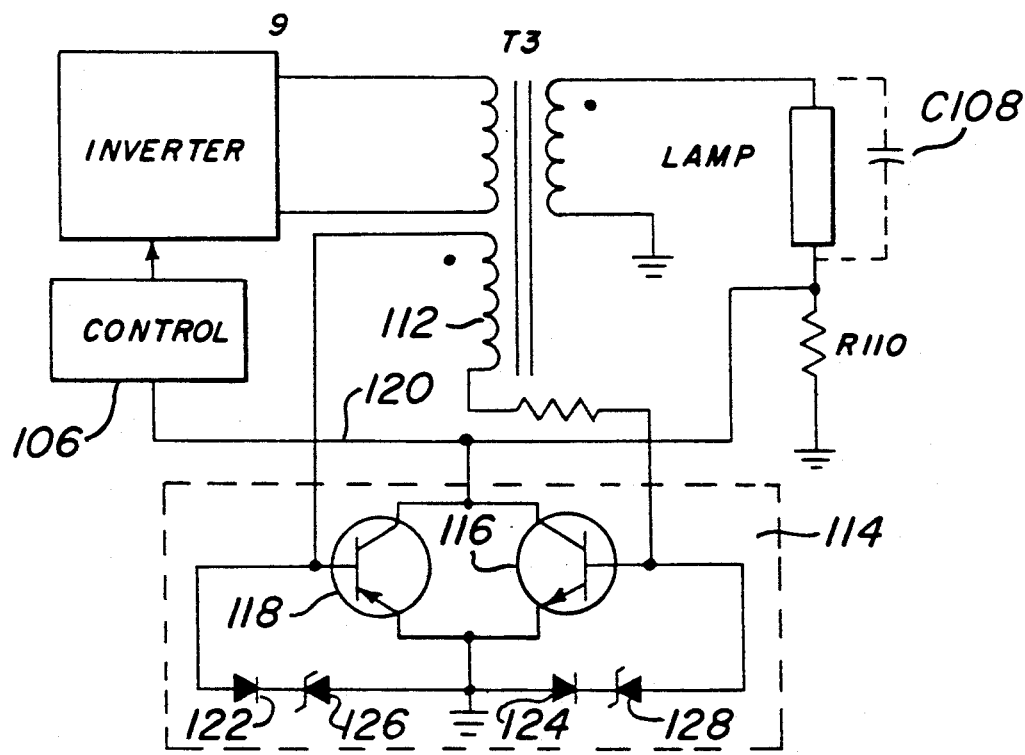
FIG. 15 is a simplified schematic diagram of a circuit which implements the block diagram of FIG. 13.

A circuit for implementing the block diagram of FIG. 13 is illustrated in FIG. 15. In FIG. 15, the capacitance of the wiring is illustrated as a capacitor C108 shown in phantom across the lamp. Current sensor I is realized by resistor R110. Since both the lamp current and capacitive current will flow through R110, the voltage across R110 is proportional to the inverter output current. The voltage sensor V is realized by a winding 112 on transformer T3, having the indicated polarity with respect to the secondary of transformer T3. Circuit 102 and multiplier 104 can be realized by circuit 114, which can be modeled as a shunt switch between the input of the control circuit and ground. When the shunt switch is open, the voltage across R110 (which is proportional to the current in R110) is applied to the input of control circuit 106. When the shunt switch is closed, the voltage across 110, and hence the input to control circuit 106 is zero.

Circuit 114 comprises transistors 116 and 118 connected between control input 120 and ground. Although transistors 116 and 118 are shown as bipolar transistors, it should be understood that other switching devices can be used without departing from the scope of the invention. Circuit 114 operates as follows: When the output of inverter 9 is positive, the voltage across winding 112 will cause the base of transistor 118 to be positive with respect to the base of transistor 116. The base of transistor 118 will also be positive with respect to ground, and the base of transistor 116 will be negative with respect to ground. Thus, both transistors will be off. Hence, during the positive half cycle of the inverter output current, circuit 114 will appear as an open switch between control input 120 and ground, and the voltage across R110 will be applied to control circuit 106. During the negative half cycle, the voltage across winding 112 will cause the base of transistor 116 to be positive relative to the base of transistor 118. In addition, the base of transistor 116 will be positive relative to ground and the base of transistor 118 will be negative relative to ground, turning both transistors on. With both transistors on, circuit 114 appears as a closed switch between control input 120 and ground, and the input to control circuit 106 is zero. Thus, during positive half cycles, the input to control circuit 106 is the voltage across resistor R110 and is zero during negative half cycles. Diodes 122 and 124 and zener diodes 126 and 128 are provided between the bases and emitters of transistors 118 and 116 to protect the transistors against excessive base-emitter voltage during the positive half-cycle so that the transistors will not experience base-emitter breakover.

Although the present invention is described for use with compact fluorescent lamps, the circuit herein described may control any type of gas discharge lamp. Since certain changes may be made in the above described circuit without departing from the scope of the invention herein involved, it is intended that all matter contained in the above description or shown in the accompanying drawings shall be interpreted in an illustrative and not a limiting sense.

We claim:

1. An electromagnetic circuit for providing power from an ac source to a pair of series connected gas discharge lamps mounted in a grounded fixture, comprising:
    (a) a ferromagnetic core;
    (b) a primary winding having at least one turn electromagnetically coupled to said core and electrically connected to said ac source;
    (c) a secondary winding having a plurality of turns electromagnetically coupled to said core and said primary winding and electrically connected across said pair of gas discharge lamps in series; and
    (d) a center tap electrically dividing said secondary winding into first and second portions, said center tap being electrically connected to said grounded fixture;
    whereby the electrical potentials of said lamps to a ground plane of said grounded fixture are approximately equal.

2. The electromagnetic circuit as recited in claim 1 wherein the number of turns of said secondary winding to the number of turns of said primary winding is in a ratio of approximately 6:1.

3. The electromagnetic circuit as recited in claim 2 wherein the number of turns of said first portion to the number of turns of said second portion of said secondary winding is in a ratio of approximately 9:4.

4. The electromagnetic circuit as recited in claim 1 further comprising a current sensing circuit electrically connected between said first and second portions of said secondary winding.

5. The electromagnetic circuit as recited in claim 4 wherein said current sensing circuit comprises a resistor electrically connected between said first and second portions of said secondary winding.

6. The electromagnetic circuit as recited in claim 5 wherein said current sensing circuit further comprises a voltage breakover device in series with said resistor, and a second resistor in parallel with said breakover device such that current flow through said current sensing circuit produces a voltage thereacross having a dual slope characteristic.

7. The electromagnetic circuit as recited in claim 1 further comprising a capacitor electrically connected across one of said lamps to help balance the light output of said pair of lamps at low light levels.

8. The electromagnetic circuit as recited in claim 1 further comprising means for simultaneously providing a dc component of current flow between said lamp electrodes to substantially eliminate the occurrence of visible striations.

* * * * *